United States Patent [19]

Reiman et al.

[11] Patent Number: 5,787,150

[45] Date of Patent: *Jul. 28, 1998

[54] METHOD AND SYSTEM FOR AUTOMATED COLLECT CALL MESSAGING

[75] Inventors: Doug Reiman, Cedar Rapids; Rick L. Groene, Marion; Duraisamy Gunasekar, Cedar Rapids; Samuel Mullins, Iowa City; Jesse E. Peterson; Arunachalam Venkatraman, both of Cedar Rapids, all of Iowa

[73] Assignee: MCI Communications Corporation, Washington, D.C.

[*] Notice: This patent issued on a continued prosecution application filed under 37 CFR 1.53(d), and is subject to the twenty year patent term provisions of 35 U.S.C. 154(a)(2).

[21] Appl. No.: 580,949

[22] Filed: Dec. 29, 1995

[51] Int. Cl.⁶ .................... H04M 3/50; H04M 7/00
[52] U.S. Cl. .................. 379/67; 379/89; 379/114; 379/222; 379/265
[58] Field of Search ................... 379/67, 84, 88, 379/89, 112, 113, 114, 218, 222, 223, 260, 265, 266

[56] References Cited

U.S. PATENT DOCUMENTS

| | | | |
|---|---|---|---|
| 4,054,756 | 10/1977 | Comella et al. | 179/18 |
| 4,932,042 | 6/1990 | Baral et al. | 379/67 |
| 4,972,461 | 11/1990 | Brown et al. | 379/67 |
| 5,355,406 | 10/1994 | Chencinski et al. | 379/89 |
| 5,463,677 | 10/1995 | Bash et al. | 379/88 |
| 5,535,270 | 7/1996 | Doremus et al. | 379/88 |

FOREIGN PATENT DOCUMENTS

| | | |
|---|---|---|
| 0 106 575 A2 | 4/1984 | European Pat. Off. |
| 0 480 622 A2 | 4/1992 | European Pat. Off. |
| 0626 774 A1 | 11/1994 | European Pat. Off. |
| WO 90/03700 | 4/1990 | WIPO |

OTHER PUBLICATIONS

"OCTEL User Reference Manual," Octel Communications Corporation, PN 101-1327-001 Version 2, Nov. 1994.

*Primary Examiner*—Daniel S. Hunter

[57] ABSTRACT

Method and apparatus allow a caller to contact a called party with a collect call whether or not the called station is answered or is busy. When the caller dials a collect call access code, the call is routed to a messaging platform which collects the call information and attempts to complete the call. If there is no answer or if the called station is busy, the messaging platform retains control of the call and automatically prompts the caller to enter a name and a message to be delivered to the called party. After the name and message have been entered, the caller is given a confirmation number, if desired, which allows the caller to determine whether the called party has received the message. The messaging platform repeatedly attempts to deliver the message by calling the called party. Upon the call being answered, the messaging platform identifies the caller and prompts the called party to accept or refuse the collect message. If the called party accepts the message, the messaging platform plays it and the called party is charged for the message.

39 Claims, 13 Drawing Sheets

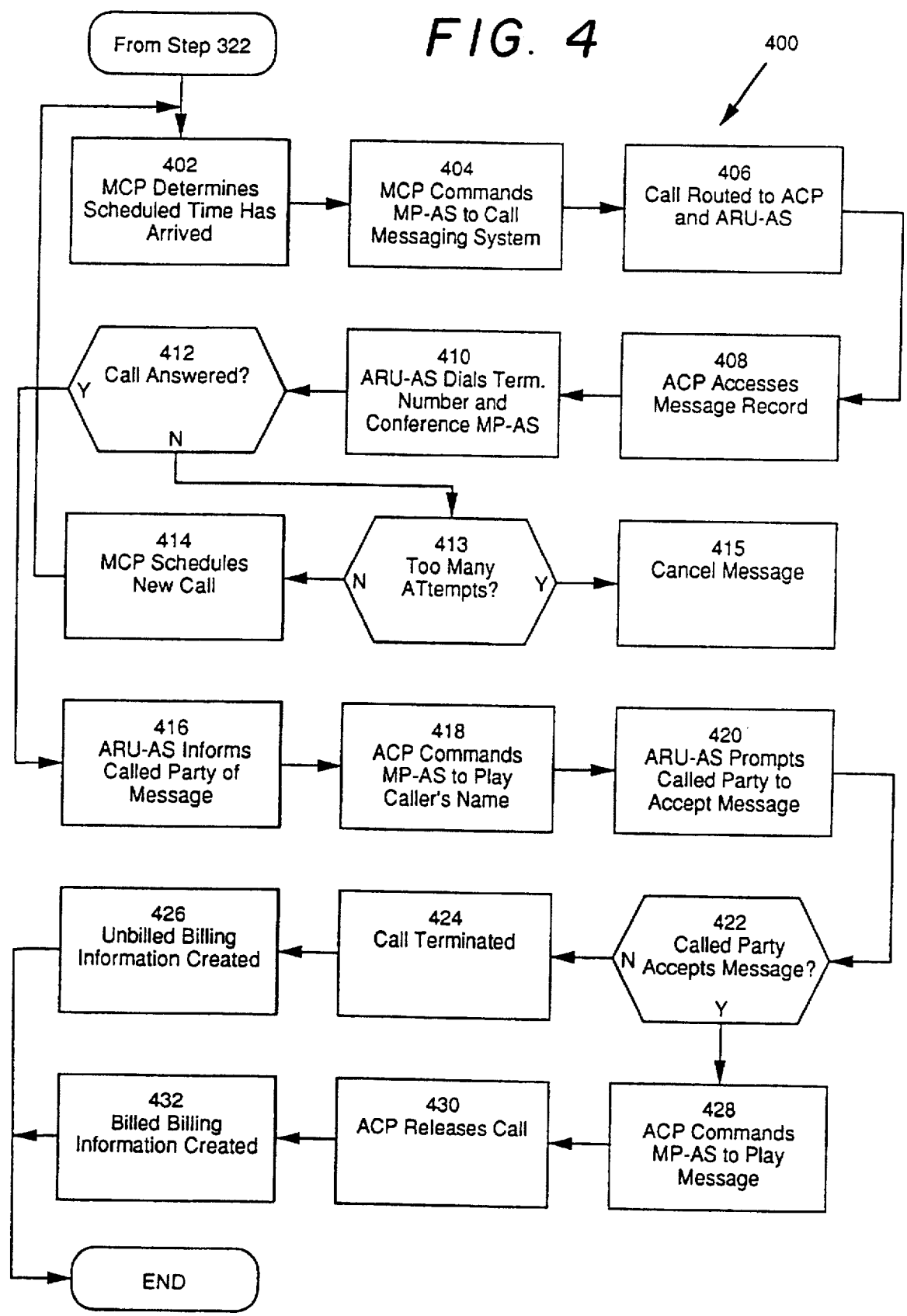

METHOD AND SYSTEM FOR AUTOMATED COLLECT CALL MESSAGING

BACKGROUND OF THE INVENTION

1. Field of the Invention

The invention relates generally to telephone messaging service, and in particular to automated collect call messaging systems.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Background Information

Collect calls allow a caller to transfer charges for a call to the account of the telephone station receiving the call, at the option of the called party. Currently, the called party must answer the call and accept the charges, in order for a collect call to be completed. If the called station is not answered or is busy, the call cannot be completed. A need exists to enable a caller to complete a collect call by leaving a message to be delivered to a called party, at the option of the called party, if the called station is not answered or is busy when the call is placed.

U.S. Pat. No. 4,932,042 to Baral et al. describes an apparatus and method for spontaneous voice and data messaging. Baral et al. discloses a toll switch having a dual tone multi-frequency (DTMF) receiver and a voice message operations center (VMOC) having voice messaging equipment. When the toll switch receives a call, it attaches the DTMF receiver to the call pending reception of an answer in order to detect signals keyed by the calling customer. A message informing the calling customer of the availability of voice messaging service may be played during the ringing period or during or instead of a busy signal. If the calling customer desires to leave a voice message, he must dial a key sequence, such as *867, which is detected by the DTMF receiver of the toll switch. Upon receipt of such a key sequence, the toll switch connects the call to the VMOC, which records and delivers the voice message. Such an arrangement requires DTMF receivers to be installed at each toll switch at which voice messaging service is to be available. In order to offer comprehensive service, all toll switches would have to be so modified. The expense of such modifications is likely to be large. Further, the arrangement requires the caller to enter a key sequence in order to be connected to the VMOC; the toll switch does not detect that the called station is not answered or is busy. Finally, the arrangement does not handle message delivery billed to the called party.

U.S. Pat. No. 4,972,461 to Brown et al. describes a call message delivery system and method. Brown et al. discloses a call delivery service apparatus and method which enable non-subscriber callers to a common carrier network to bill a voice message delivery to their billing code (e.g. credit card number), and to check the delivery status of the message from the network during a subsequent call. A caller who would like to leave a message to be delivered to a specified phone number gains access to the system by dialing an 800 number associated with the system. The system then prompts the caller to enter the billing code and the destination phone number for the message. This system does not provide spontaneous messaging upon detection of a no answer or busy condition of a called station. In addition, it does not handle message delivery billed to the called party.

Accordingly, a need exists to provide automated collect call voice messaging.

SUMMARY OF THE INVENTION

An object of the present invention is an automated voice messaging system for collect calls.

Another object is an automated collect call system for completing calls regardless of whether the called station is not answered or is busy.

Another object is an automated collect call system for delivery of collect calls by voice mail.

Another object is a method of completing an unanswered collect call by voice mail.

These and other objects, features and advantages are provided by the method and system for automated collect call messaging. When the caller dials a collect call access code, the call is routed to a messaging platform which collects the call information and attempts to complete the call. If there is no answer or if the call is busy, the messaging platform retains control of the call and automatically prompts the caller to enter a name, if the name was not already recorded, and a voice mail message to be delivered to the called party. After the name and voice mail message have been entered, the caller is given a confirmation number, if desired, which allows the caller to determine whether the called party has received the message. The messaging platform repeatedly attempts to deliver the voice mail message by calling the called party. Upon the call being answered, the messaging platform identifies the caller and prompts the called party to accept or refuse the collect voice mail message. If the called party accepts the message, the messaging platform plays it and the called party is charged for the message.

It is seen that the present invention requires no equipment to be added to existing switches as the switches need not detect key sequences. Further, the messaging platform is connected from the inception of the call and itself monitors the call and detects that the called station is not answered or is busy. Therefore, the caller need do nothing to be connected to the messaging platform. Finally, the messaging platform handles the initiation of collect calls in an automated manner.

BRIEF DESCRIPTION OF THE DRAWINGS

FIG. 1b is an exemplary block diagram of a computer system which is representative of AP 126, ISNAP 136, ACP 142, MCP 144 and billing system 140 shown in FIG. 1a.

FIG. 1c is a block diagram of an audio server which is representative of ARU-AS 134 and MP-AS 146 shown in FIG. 1a.

FIG. 3b is a flow diagram of a subprocess of step 308 of FIG. 3a of messaging process 300 of FIG. 3a.

FIG. 4 is a flow diagram of a message delivery process 400 of FIG. 2a, implemented by system 100.

DETAILED DESCRIPTION OF THE INVENTION

Figure 1A:
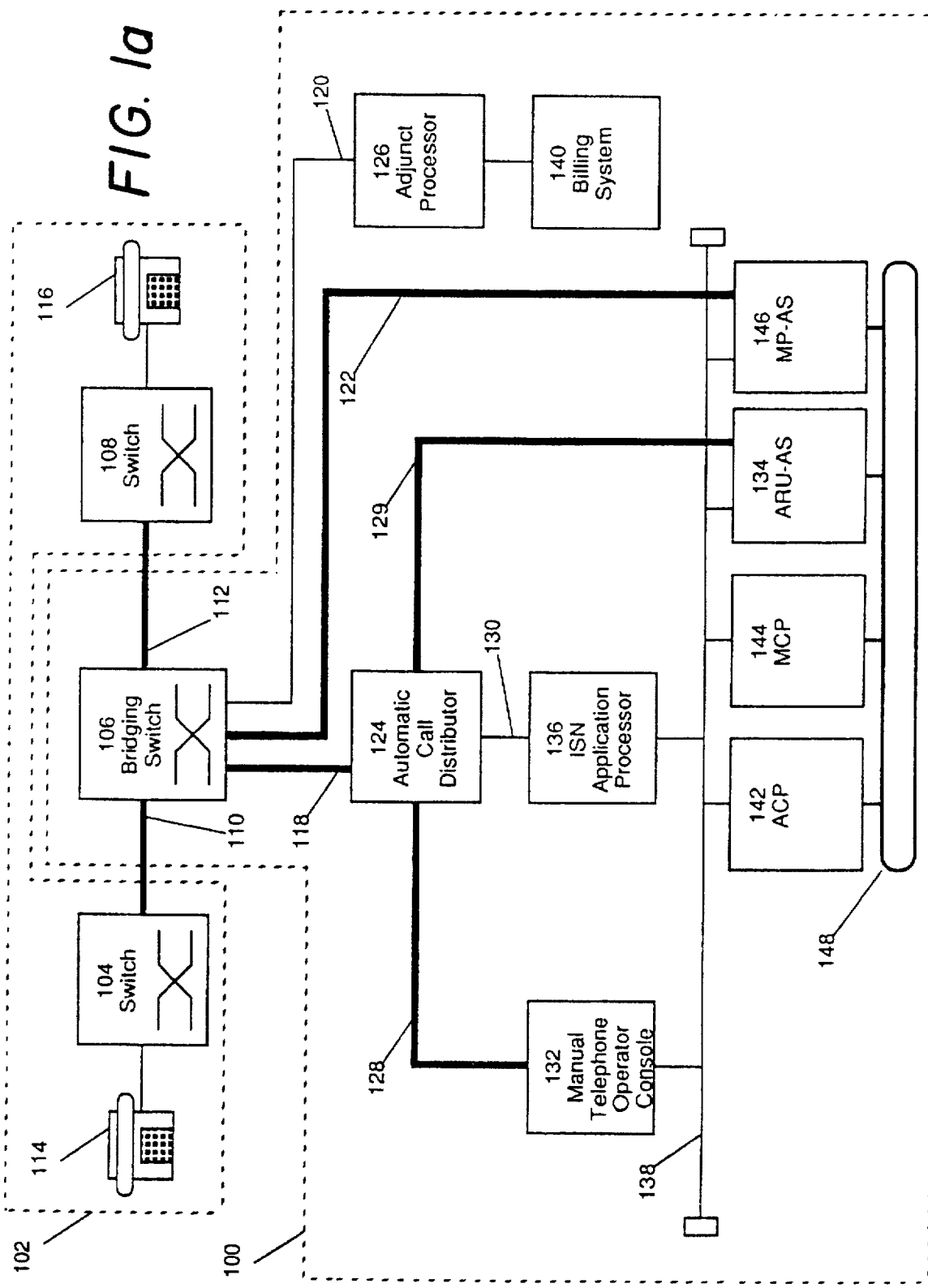
FIG. 1a is a block diagram of a collect call messaging platform 100 in accordance with the present invention.

FIG. 1a is a block diagram of a collect call messaging system 100, in accordance with the present invention. Also shown is conventional public switched telephone network 102. As an example, the internal details of network 102 are represented by conventional switches 104 and 108, conventional trunks 110 and 112 and conventional telephone sets 114 and 116. System 100 includes bridging switch 106, connected to network 102 by trunks 110 and 112. Bridging switch 106 allows a call to be simultaneously connected among three parties. In addition to connections over trunks 110 and 112, bridging switch 106 can make connections over line 118, which connects to automatic call distributor (ACD) 124 and line 122, which connects to messaging platform audio server (MP-AS) 146. ACD 124 routes calls for handling by either manual telephone operator console (MTOC) 132 or automated audio response unit/audio server (ARU-AS) 134. ACD 124 delivers the signaling information of each call to intelligent services network application processor (ISNAP) 136 over data connection 130. ISNAP 136 selects the type of equipment to which the call is to be routed and sends control commands to ACD 124 over data connection 130. ACD 124 delivers the audio portion of the call to either MTOC 132 over audio connection 128 or to ARU-AS 134 over audio connection 129. MTOC 132 is conventional equipment with which human operators manually answer calls and manually enter information obtained from the caller. ARU-AS 134 is conventional equipment which automatically answers calls and obtains information from the caller. ARU-AS 134 does this by, for example, playing pre-recorded prompting messages to the caller and detecting touch tone keys pressed by the caller. ARU-AS 134 includes a conventional audio server which digitally records, stores and plays back voice messages.

Application call processor (ACP) 142 and message control processor (MPC) 144 are standard processors which control different portions of the collect call and messaging processes. ACP 142 and MPC 144 implement portions of the processes which perform standard collect call service and collect messaging service. ACP 142 receives status information from ARU-AS 134 and issues commands to control ARU-AS 134 in the collection of information required to perform standard collect call service. ACP 142 also receives status information from ARU-AS 134 and MP-AS 146 and issues commands to control both ARU-AS 134 and MP-AS 146 in the performance of collect messaging service. ARU-AS 134 is connected to ACD 124 and handles incoming calls to the system. MP-AS 146 is an audio server similar to that in ARU-AS 134, except that it is connected to bridging switch 106 and has been arranged so that it is capable of initiating calls.

Although only single blocks are shown, system 100 and each block within represent multiple equipment located in diverse geographical locations, but all communicating over local/wide area network (LWAN) 138. LWAN 138 is a standard network comprising, for example, multiple interconnected Ethernet local area networks. ARU-AS 134, ACP 142, MCP 144 and MP-AS 146 also communicate over local area network (LAN) 148. LAN 148 is a standard network, such as Token Ring. Although it is not required, typically, each group of ARU-AS 134, ACP 142, MCP 144 and MP-AS 146 are located at the same site, so LAN 148 is used to interconnect them. The use of LAN 148 allows the bulk of messaging traffic to be intercommunicated without use of LWAN 138. Messaging traffic comprises mainly digitized voice messages, which tend to comprise large amounts of data compared to the usual signaling traffic on LWAN 138. Intercommunicating messaging traffic over LWAN 138 would consume too many network resources. Use of LAN 148 avoids consumption of those resources and prevents any interference with signaling traffic.

Bridging switch 106 also communicates with adjunct processor (AP) 126 which extracts billing information from switch 106 over data connection 120. AP 126 processes the extracted billing information and sends it to billing system 140.

Figure 1B:
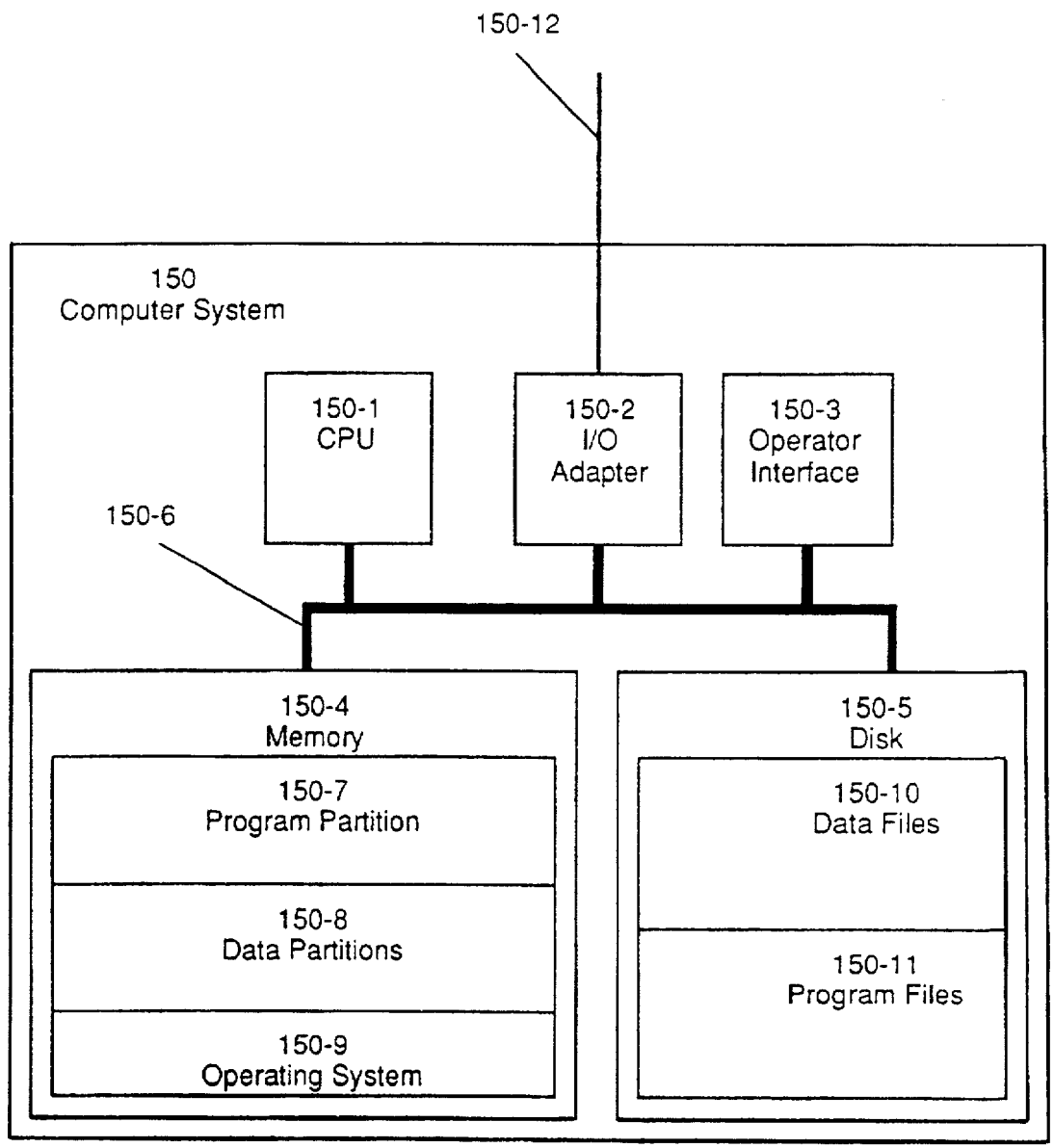

FIG. 1b is an exemplary block diagram of a computer system 150 which is representative of AP 126, ISNAP 136, ACP 142, MCP 144 and billing system 140. Each of these blocks comprise at least one such computer system. Although only one each of AP 126, ISNAP 136, ACP 142, MCP 144 and billing system 140 are shown in FIG. 1a, it is well known in the art that a distributed architecture in which more than one computer system performs each function is entirely equivalent. System 150 includes a CPU 150-1, for executing program instructions and processing data, memory 150-4, for storing program instructions executed by and data processed by CPU 150-1, disk storage 150-5, for storing data to be transferred to and from memory, and at least one I/O adapter 150-2, for communicating with other devices and transferring data in and out of the computer system over connection 150-12. System 150 may also include an operator interface 150-3, for providing status information to and accepting commands from a system operator. All these elements are interconnected by bus 150-6, which allows data to be intercommunicated between the elements. I/O adapter 150-2 represents one or more I/O adapters or network interfaces which may connect to local or wide area networks, such as, for example LWAN 138 or LAN 148 or directly to other components. Therefore, connection 150-12 represents a LAN or WAN or a direct connection to other equipment.

Memory 150-4 is accessible by CPU 150-1 over bus 150-6 and includes operating system 150-9, program partition 150-7 and data partition 150-8. Program partition 150-7 stores and allows execution by CPU 150-1 of program instructions which implement the functions of each respective system, AP 126, ISNAP 136, ACP 142, MCP 144 and billing system 140. Data partition 150-8 is accessible by CPU 150-1 and stores data used during the execution of program instructions. In AP 126, program partition 150-7 contains program instructions which implement extraction and processing of billing information from switch 106. In ISNAP 136, program partition 150-7 contains program instructions which selects an operator group, either MTOC 132 or ARU-AS 134, to which calls are to be routed by ACD 124. In ACP 142, program partition 150-7 contains program instructions which implement a collect calling service process 200, shown in FIG. 2a, which controls standard collect calling service. In MCP 144, program partition 150-7 contains program instructions which implement portions of collect calling service process 200, messaging process 300, and message delivery process 400, all shown in FIG. 2a. In billing system 140, program partition 150-7 contains program instructions which implement processing of billing information.

Figure 1C:
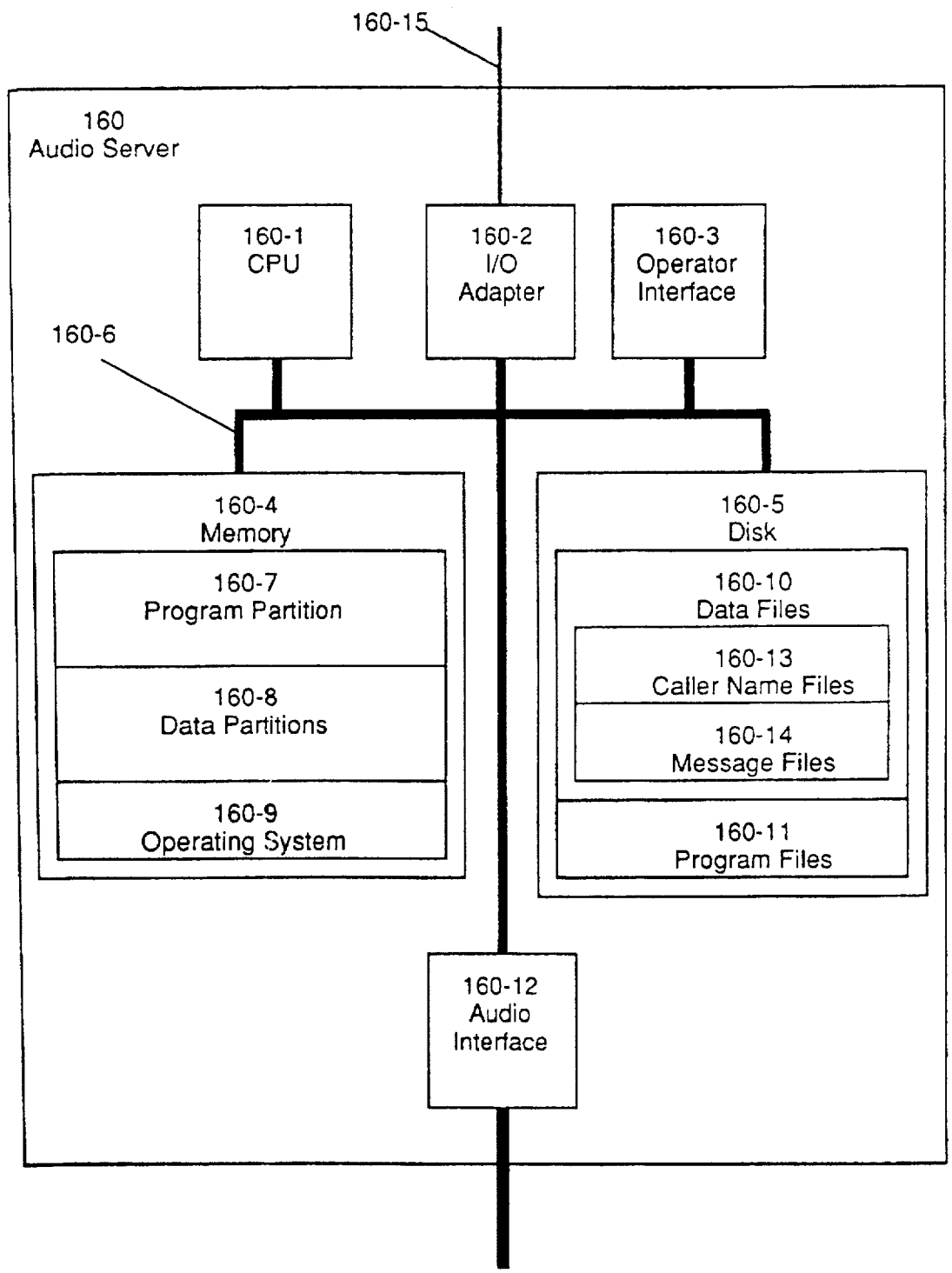

FIG. 1c is an exemplary block diagram of an audio server 160 which is representative of ARU-AS 134 and MP-AS 146. Each of these blocks comprise at least one such audio server. Although only one each of ARU-AS 134 and MP-AS 146 are shown in FIG. 1a, it is well known in the art that a distributed architecture in which more than one audio server performs each function is entirely equivalent. Audio server 160 includes a CPU 160-1, for executing program instructions and processing data, memory 160-4, for storing program instructions executed by and data processed by CPU 160-1, disk storage 160-5, for storing data to be transferred to and from memory, at least one I/O adapter 160-2, for communicating with other devices and transferring data in and out of the audio server over connection 160-15, and at least one audio interface 160-12, for communicating audio signals. Audio server 160 may also include an operator interface 160-3, for providing status information to and accepting commands from a server operator. All these elements are interconnected by bus 160-6, which allows data to be intercommunicated between the elements. I/O adapter 160-2 represents one or more I/O adapters or network interfaces which may connect to local or wide area networks, such as, for example LWAN 138 or LAN 148 or directly to other components. Therefore, connection 160-15 represents a LAN or WAN or a direct connection to other equipment.

Audio interface 160-12 interfaces audio server 160 to audio trunk lines, typically at least one T1 line. Each T1 line is capable of carrying 24 calls. Audio server 160 typically has the throughput necessary to handle 72 calls simultaneously, therefore, three T1 lines would be connected to each audio interface 160-12.

Memory is accessible by CPU 160-1 over bus 160-6 and includes operating system 160-9, program partition 160-7 and data partition 160-8. Program partition 160-7 stores and allows execution by CPU 160-1 of program instructions which implement the functions of each respective system, ARU-AS 134 and MP-AS 146. Data partition 160-8 is accessible by CPU 160-1 and stores data used during the execution of program instructions. In ARU-AS 134, program partition 160-7 contains program instructions which implement portions of processes 200, 300 and 400, as described below. In MP-AS 146, program partition 160-7 contains program instructions which implement portions of processes 300 and 400, as described below.

Disk 160-5 contains data files 160-10. These files are used for voice message storage. Files 160-10 include caller name files 160-13 and message files 160-14. These files contain digital recordings of callers' names and voice messages respectively.

Figure 2A:
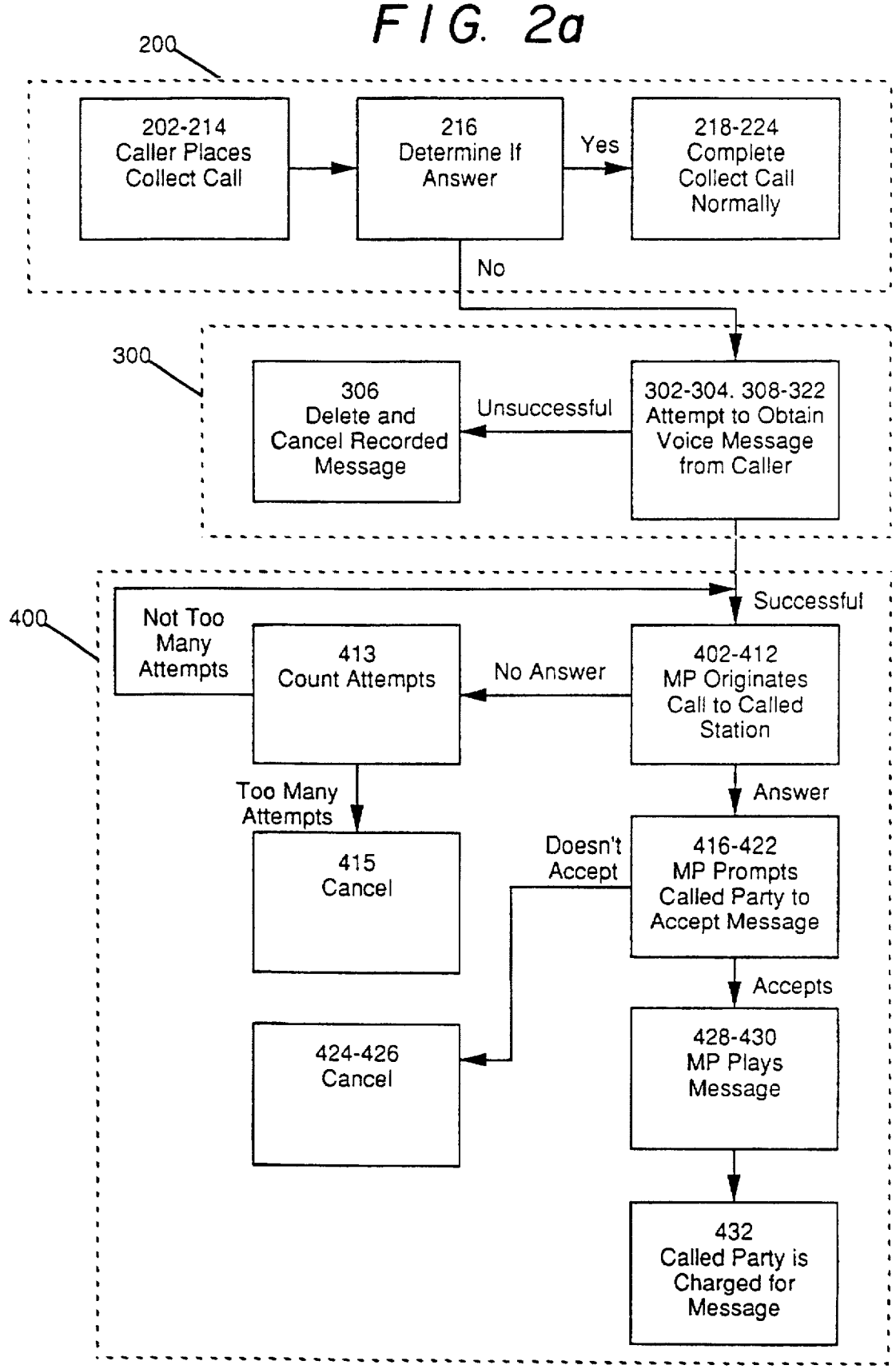
FIG. 2a is a overview flow diagram of the processes of the present invention implemented in messaging platform 100.

FIG. 2a is an overview flow diagram of the processes implemented in messaging platform 100, showing the interaction of collect calling service process 200, messaging process 300 and message delivery process 400. Process 200 includes steps 202-214, in which a caller places a collect call, messaging platform 100 collects the necessary information and the call is connected to the called station. In step 216, messaging platform 100 determines whether the called station is answered. If so, process 200 then completes the collect call normally in steps 218-224. If the called station does not answer or is busy, messaging process 300 is invoked. Process 300 includes steps 302-304 and 308-322, in which messaging platform 100 attempts to obtain a recorded voice name, if necessary, and a recorded message from the caller. If this attempt is unsuccessful, the process goes to step 306, in which the messaging call is canceled, with the appropriate treatment. If the attempt is successful, message delivery process 400 is invoked. Process 400 includes steps 402-412, in which messaging platform 100 originates a call to the called station in an attempt to deliver the message. If there is no answer, or the terminating number is busy, the process goes to step 413, in which messaging platform 100 examines the number of delivery attempts which have been made. If there have been too many delivery attempts, the process goes to step 415, in which the message delivery is canceled. If there have not been too many delivery attempts, the process loops back to step 402. If, in step 412, the call is answered, the process goes to steps 416-422, in which messaging platform 100 identifies the caller by playing back the recorded name file and prompts the called party to accept the message. If the called party does not accept the message, the process goes to steps 424-426, in which the message is canceled, with the appropriate treatment. If the called party accepts the message, the process goes to step 428-430, in which messaging platform 100 plays the message to the called party. In step 432, the called party is charged for the message delivery.

Figure 2B:
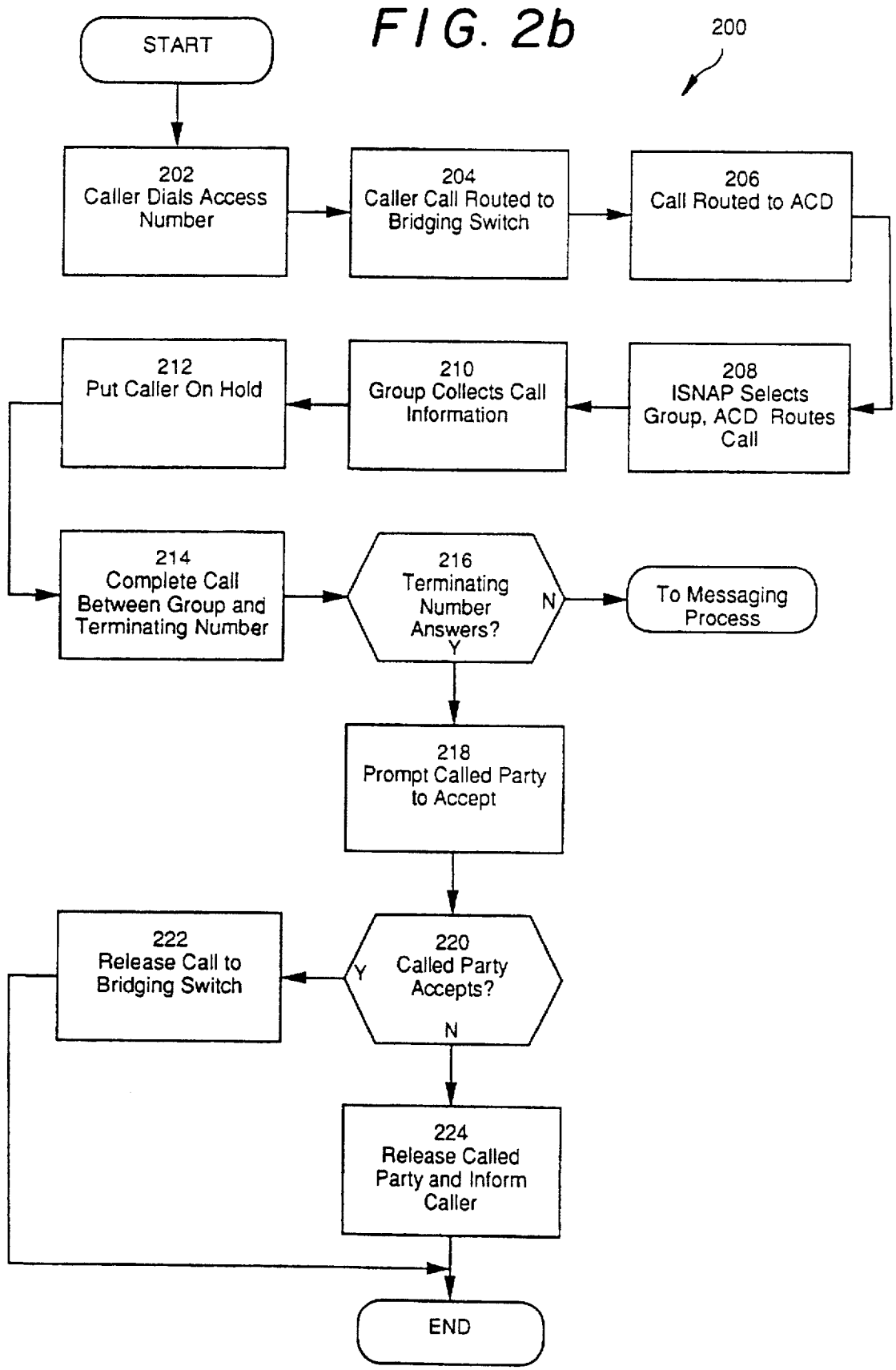
FIG. 2b is a flow diagram of collect calling service process 200 of FIG. 2a, implemented by system 100.

FIG. 2b is a flow diagram of collect calling service process 200, implemented by system 100 in conjunction with network 102, as shown in FIG. 1a, in accordance with the present invention. Process 200 begins with step 202, in which a caller dials the access number for collect calling service. For example, the caller may dial an "800" access number or the caller may dial "0+terminating number". In step 204, network 102 recognizes the access number and routes the call to bridging switch 106. In step 206, bridging switch 106 routes the call to ACD 124. In step 208, ACD 124 sends the signaling information, including the terminating number, associated with the call to ISNAP 136, which selects an operator group, either MTOC 132 or ARU-AS 134, to which the call is to be routed. ISNAP 136 sends the routing command to ACD 124, which then routes the call accordingly. In step 210, a member of the operator group to which the call was routed collects the information needed to complete collect calling service. This information includes the terminating number, if an "800" access number was dialed and always includes the caller's name. If the operator group is ARU-AS 134, the caller's name is recorded. In step 212, the caller is put on hold while the call is completed. In step 214, the call is completed between the operator group and the terminating number, allowing messaging system 100 to monitor the call. In step 216, system 100 determines whether the terminating number answered the call. If the terminating number did not answer the call, either due to ring-no-answer or due to a busy signal, system 100 invokes messaging process 300. If the terminating number does answer, the process goes to step 218, in which the operator group prompts the called party to accept the collect call. In step 220, it is determined whether the called party accepts the collect call. If the called party accepts the call, the process goes to step 222, in which the bridging switch connects the caller to the called party and releases the connection to the operator group. The process then ends. If the called party does not accept the call, the process goes to step 224, in which the operator group releases the called party and informs the caller of the refusal of the call. The process then ends.

Figure 3A:
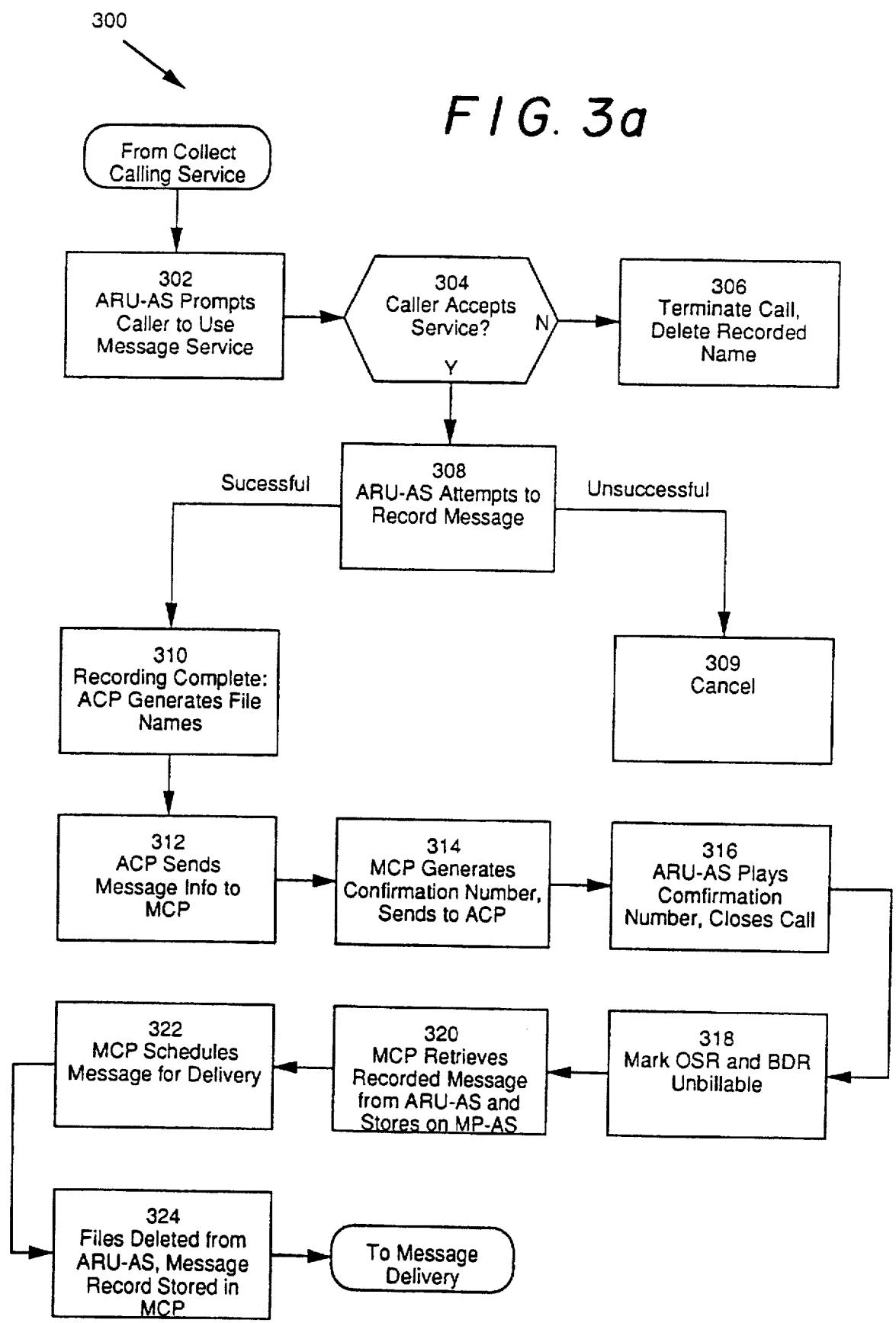
FIG. 3a is a flow diagram of a messaging process 300 of FIG. 2a, implemented by system 100.

FIG. 3a is a flow diagram of messaging process 300, implemented by system 100 in conjunction with network 102, as shown in FIG. 1a, in accordance with the present invention. Process 300 begins with step 302, in which the call is connected to ARU-AS 134, which prompts the caller to use the messaging service. In step 304, it is determined whether the caller accepts messaging service. If not, the process goes to step 306, in which the call is terminated and the caller's name, if it was recorded in step 210 of FIG. 2, is deleted. If the caller accepts messaging service, the process continues with step 308, in which ARU-AS 134 attempts to record the message, and if necessary, the caller's name. If the attempt to record the message is unsuccessful, the process goes to step 309, in which the process is canceled. If the attempt to record the message is successful, the process goes to step 310, in which ACP 142 generates file names which identify the recorded name and message. In step 312, ACP 142 informs MCP 144 that the message has been recorded by sending a message information record to MCP 144. The message information record includes the called number, other call attributes such as, for example, a coupon or promotional offer number, the address of the ARU-AS that recorded the name and message (in a typical embodiment, there are several ARU-ASs), the file names identifying the caller's name and voice message files on ARU-AS 134, and an access number to use for message delivery. In response to this message, in step 314, MCP 144 generates a confirmation number with which the caller can obtain the delivery status of the message and sends the confirmation number to MCP 144. In step 316, ACP 142 commands ARU-AS 134 to first play a closing message to the caller, including the confirmation number, then to terminate the call. In step 318, bridging switch 106 generates billing information in the form of an operator service record (OSR) and sends it via AP 126 to billing system 140. Likewise, ACP 142 generates billing information in the form of a billing detail record (BDR) which is sent to billing system 140. Both the OSR and the BDR are marked as unbillable, thus indicating that no one is to be charged for the call during which the message was recorded.

In step 320, MCP 144 retrieves the recorded voice message and name files from ARU-AS 134 using the information in the message information record and stores the voice message and name locally on MP-AS 146. In step 322, MCP 144 schedules the message for delivery. In step 324, the caller's name and voice message files are deleted from ARU-AS 134 and the message information record is stored in MCP 144.

Figure 3B:
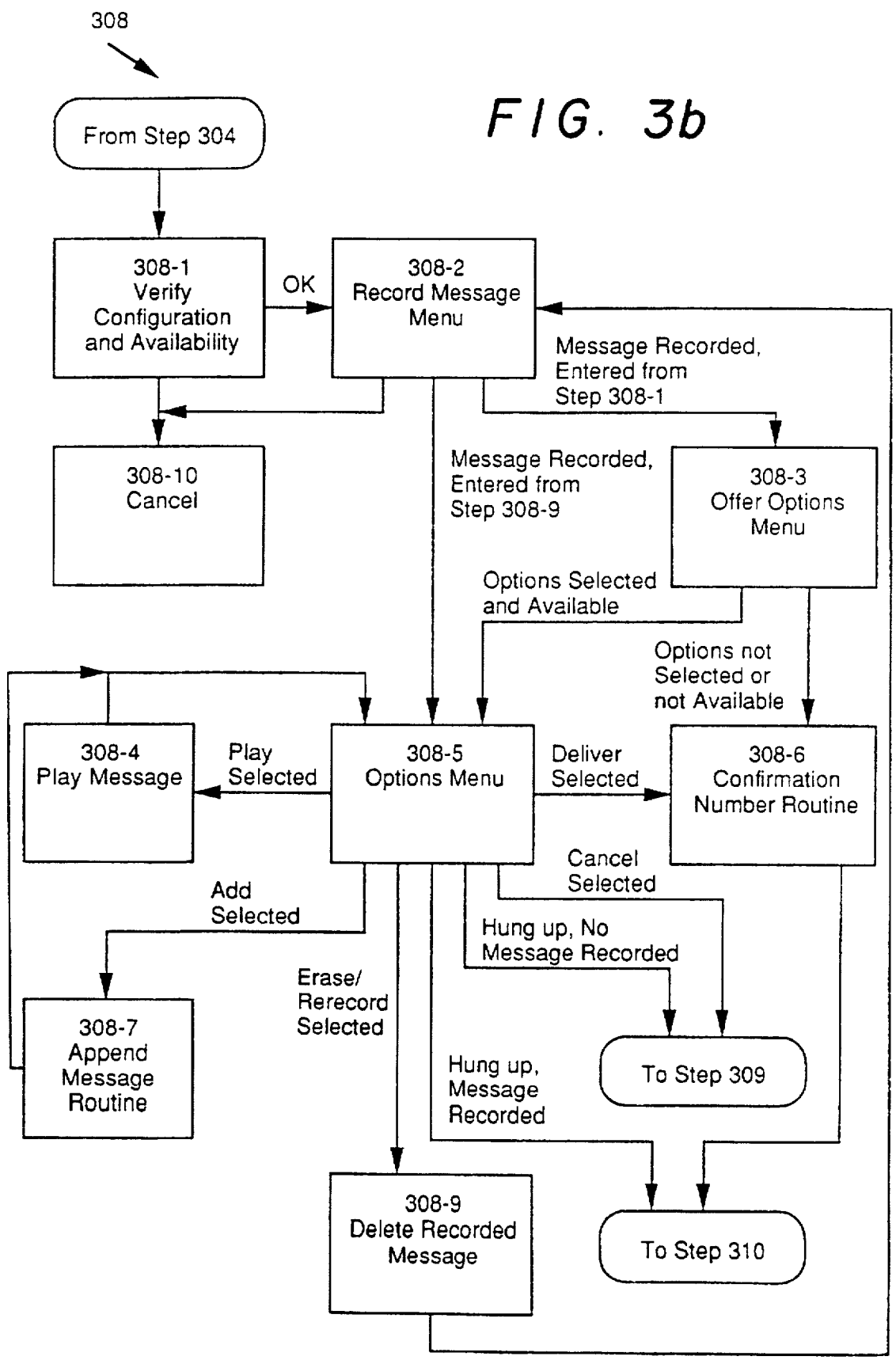

FIG. 3b is a flow diagram of a subprocess of step 308 of messaging process 300 of FIG. 3a. Subprocess 308 is entered from step 304 of FIG. 3a and begins with step 308-1, in which the configuration and availability of the messaging platform are verified. If the necessary subsystems of the messaging platform are not properly configured or are unavailable, the messaging process goes to step 308-10, in which the message is canceled. If the messaging platform is properly configured and is available, the process goes to step 308-2, in which the record message menu is performed. This menu allows the caller to record a voice message and, if necessary, a name. If a message is not properly recorded by the record message menu, the messaging process goes to step 308-10, in which the message is canceled. If a message is properly recorded and the record message menu was entered from step 308-1, the process continues with step 308-3. If a message is properly recorded and the record message menu was entered from step 308-9, the process goes to step 308-5.

In step 308-3, the offer options menu is performed. This menu allows the caller to select whether or not to enter options. If option entry is not selected, the process goes to step 308-6. If option entry is selected, the process goes to step 308-5.

In step 308-5, the options menu is performed. This menu allows the caller to select whether to perform several optional functions. These functions include: playing the message back to the caller, delivering the message, adding to the message, erasing and rerecording the message and canceling the message. If the play option is selected, the process goes to step 308-4, in which the message is played back to the caller. The process then returns to the options menu, step 308-5. If the add option is selected, the process goes to step 308-7, in which the append message routine is performed. The process then returns to the options menu, step 308-5. If the erase/rerecord option is selected, the process goes to step 308-9, in which the recorded message is deleted. The process then goes to step 308-2, in which the record message menu is again performed. If the cancel option is selected, the process goes to step 309, in which the message is deleted and canceled. If the deliver option is selected, the process goes to step 308-6. If the caller has hung up, the process goes to step 309, if no valid message has been recorded, and to step 310, if a valid message has been recorded.

In step 308-6, the confirmation number routine is performed. This routine supplies the caller with a confirmation number which may be used later to verify the delivery status of the message.

Figure 3C:
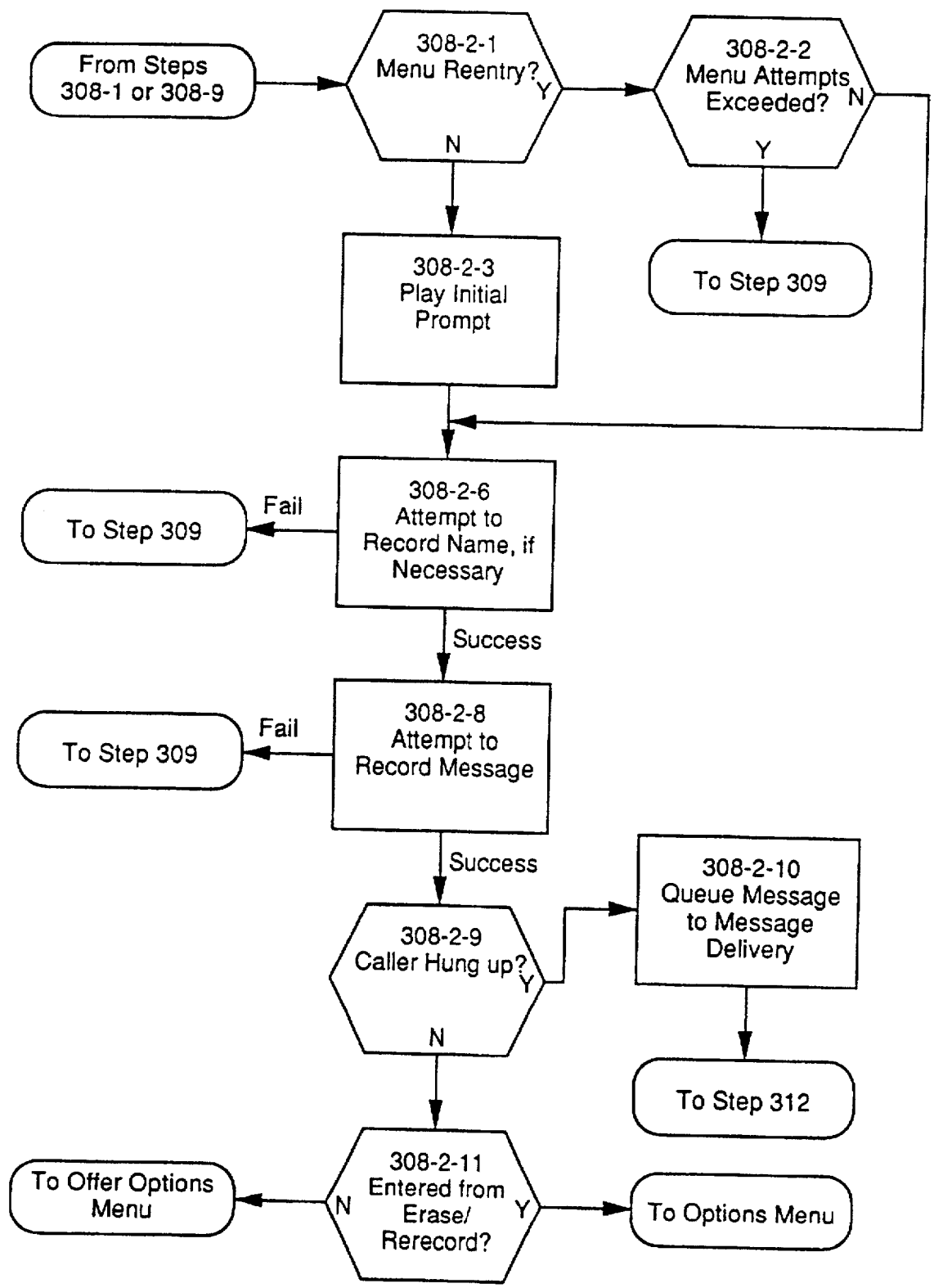
FIG. 3c is a flow diagram of a record message menu subprocess of step 308-2 of FIG. 3b.

FIG. 3c is a flow diagram of a record message menu subprocess of step 308-2 of FIG. 3b. Record message menu 308-2 is entered from either step 308-1 or step 308-9. In either case, menu 308-2 begins with step 308-2-1, in which it is determined whether menu 308-2 is being reentered from step 308-9 or is being entered for the first time from step 308-1. If menu 308-2 is not being reentered, the process goes to step 308-2-3. If menu 308-2 is being reentered, the process goes to step 308-2-2, in which it is determined whether the maximum allowed number of menu attempts has been exceeded. If the allowed menu attempts have been exceeded, the process goes to step 309, in which the process is canceled. If the allowed menu attempts have not been exceeded, the process goes to step 308-2-6.

In step 308-2-3, the initial prompt to the caller is played. In step 308-2-6, the process verifies whether the caller's name was recorded in step 210. If not, the process attempts to record the caller's name. If, after the allowed number of attempts, the caller's name has not been successfully recorded, step 308-2-6 fails and the process goes to step 309, in which the process is canceled. If the caller's name has been successfully recorded, the process goes to step 308-2-8, in which the process attempts to record the caller's message. If, after the allowed number of attempts, the caller's message has not been successfully recorded, step 308-2-8 fails and the process goes to step 309, in which the process is canceled. If the caller's message has been successfully recorded, the process goes to step 308-2-9, in which it is determined whether the caller has hung up. If the caller has hung up, the process goes to step 308-2-10, in which the message is queued to message delivery routine 400. The process then prepares for message delivery routine 400, beginning at step 310 of FIG. 3a. If the caller has not hung up, the process goes to step 308-2-11, in which it is determined whether menu 308-2 was entered from Erase/Rerecord routine 308-9. If menu 308-2 was entered from Erase/Rerecord routine 308-9, the process goes to options menu 308-5 of FIG. 3b. If menu 308-2 was entered from step 308-1, the process goes to offer options menu 308-3 of FIG. 3b.

Further description of the record message menu of the present invention may be found in the exemplary Record Message Menu Pseudocode Program Listing A in the appendix.

Figure 3D:
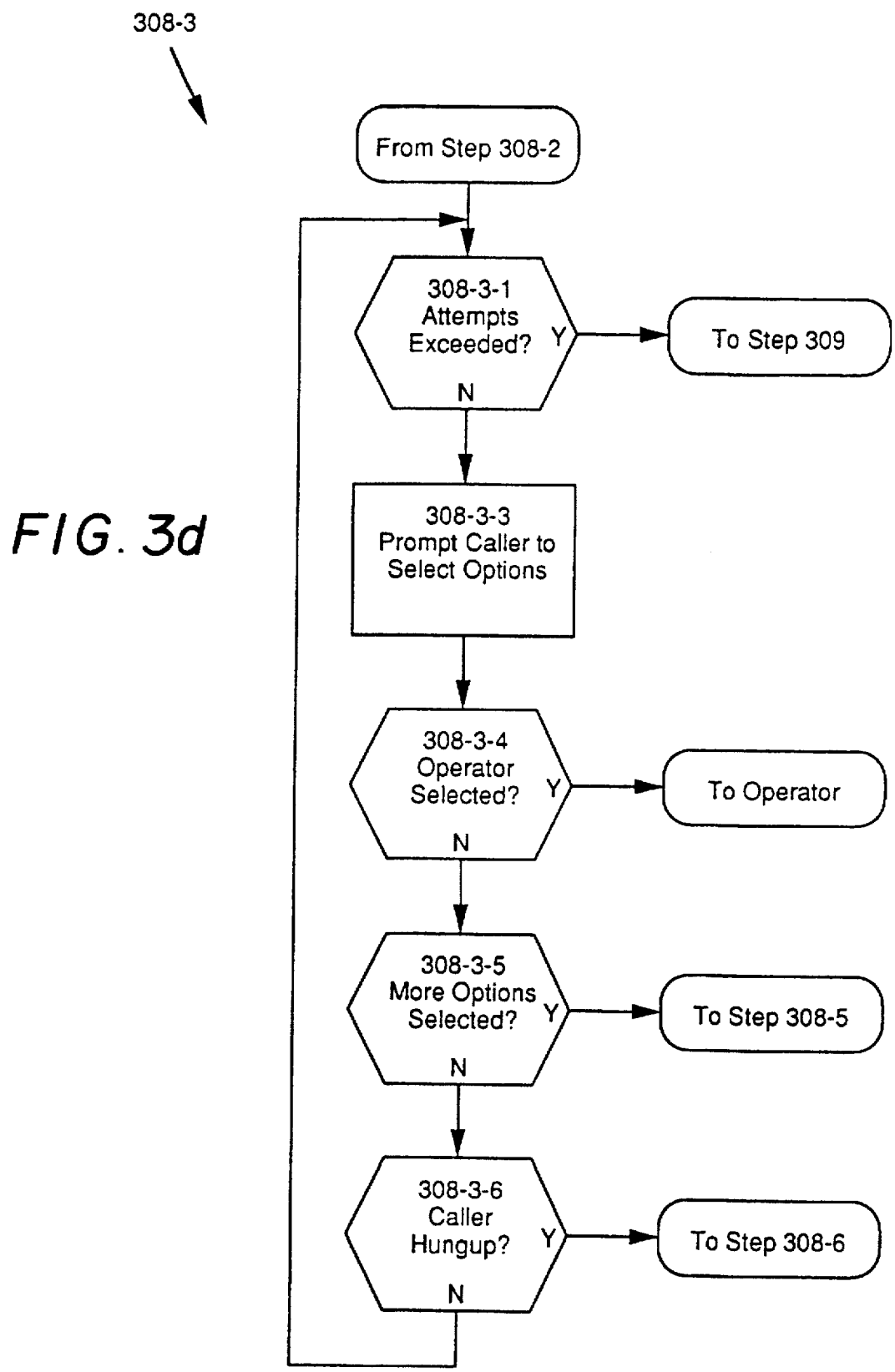
FIG. 3d is a flow diagram of an offer options menu subprocess of step 308-3 of FIG. 3b.

FIG. 3d is a flow diagram of an offer options menu subprocess of step 308-3 of FIG. 3b. Menu 308-3 is entered from step 308-2. Menu 308-3 begins with step 308-3-1 in which it is determined whether the allowable number of attempts has been exceeded. If so, the process goes to step 309, in which the process is canceled. If not, the process goes to step 308-3-3, in which the caller is prompted to select more options. In step 308-3-4, it is determined whether the caller selected more options. If so, the process goes to step 308-5, the options menu. If not, the process goes to step 308-3-5, in which it is determined whether the caller selected connection to an operator. If so, the caller is connected to an operator. If not, the process loops back to step 308-3-1.

Further description of the record message menu of the present invention may be found in the exemplary Offer Options Menu Pseudocode Program Listing B in the appendix.

Figure 3E:
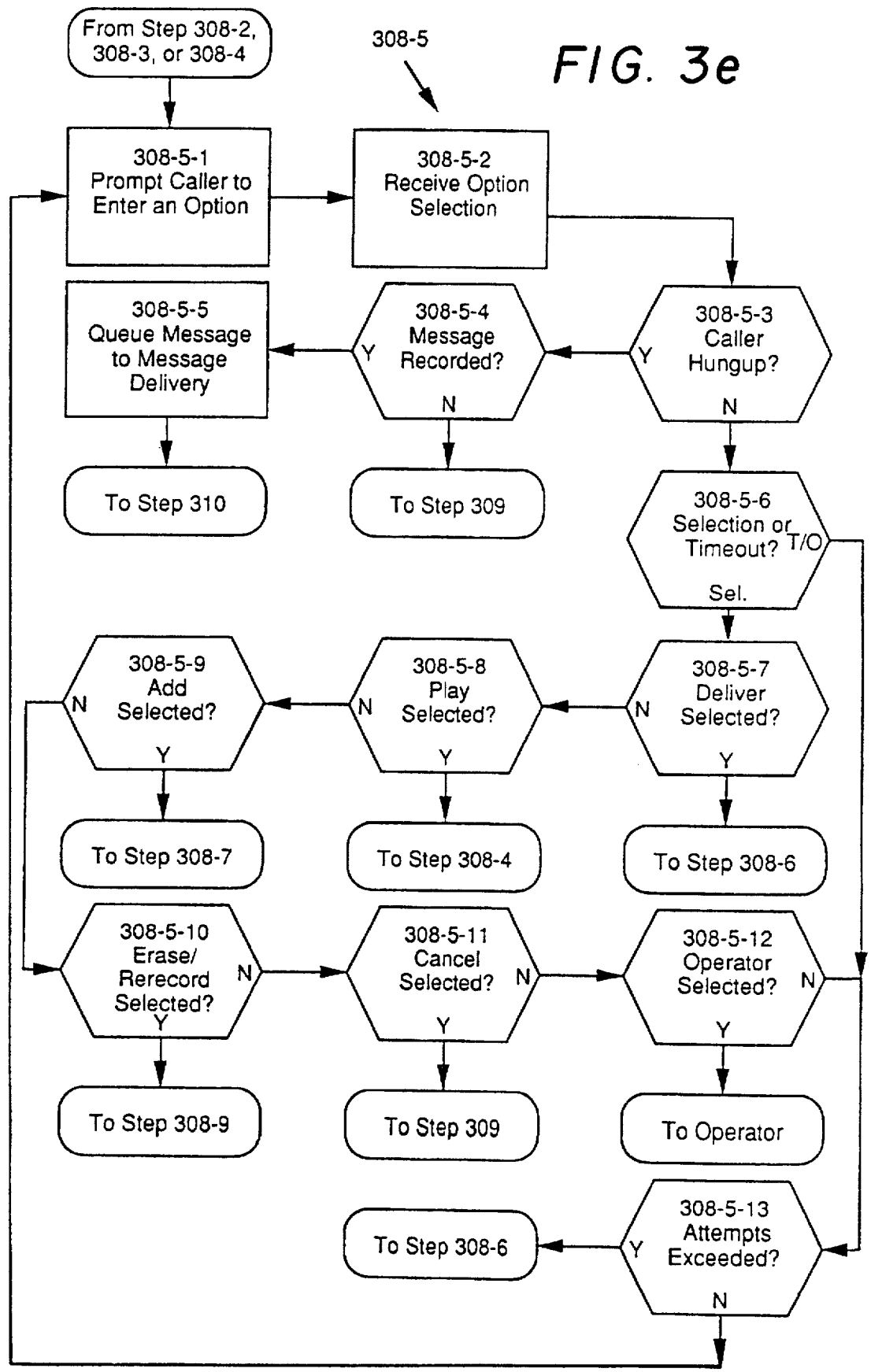
FIG. 3e is a flow diagram of an options menu subprocess of step 308-5 of FIG. 3b.

FIG. 3e is a flow diagram of an options menu subprocess of step 308-5 of FIG. 3b. Menu 308-5 is entered from either step 308-2, step 308-3, or step 308-4 of FIG. 3b. Menu 308-5 begins with step 308-5-1 in which the caller is prompted to enter an option. In step 308-5-2, the process receives the option selection entered by the caller. In step 308-5-3, it is determined whether or not the caller has hung up. If the caller has not hung up, the process goes to step 308-5-6. If the caller has hung up, the process goes to step 308-5-4, in which it is determined whether or not a message was recorded. If no message was recorded, the process goes to step 309, in which the process is canceled. If a message was recorded, the process goes to step 308-5-5, in which the message is queued to message delivery routine 400. The process then prepares for message delivery routine 400, beginning at step 310 of FIG. 3a.

In step 308-5-6, it is determined whether the caller has entered a selection or timed out without entering a selection. If the caller has timed out, the process goes to step 308-5-13. If the caller has entered a selection, the process goes to step 308-5-7, in which it is determined whether the deliver message option was selected. If so, the process goes to step 308-6, the confirmation number routine. If not, the process goes to step 308-5-8, in which it is determined whether the play message option was selected. If so, the process goes to step 308-4, in which the message is played. If not, the process goes to step 308-5-9, in which it is determined whether the add to message option was selected. If so, the process goes to step 308-7, the append message routine. If not, the process goes to step 308-5-10, in which it is determined whether the erase/rerecord option was selected. If so, the process goes to step 308-9, in which the recorded message is deleted. If not, the process goes to step 308-5-11, in which it is determined whether cancel was selected. If so, the process goes to step 309, in which the message is canceled. If not, the process goes to step 308-5-12, in which it is determined whether the connect to an operator option was selected. If so, the caller is connected to an operator. If not, all valid selections have been checked, so the selection entered by the caller is invalid and the process goes to step 308-5-13.

In step 308-5-13, it is determined whether the maximum allowed number of option selection attempts have been exceeded. If so, the process goes to step 308-6, the confirmation number routine. If not, the process goes to step 308-5-1 and the option menu is repeated.

Further description of the record message menu of the present invention may be found in the exemplary Options Menu Pseudocode Program Listing C in the appendix.

Figure 3F:
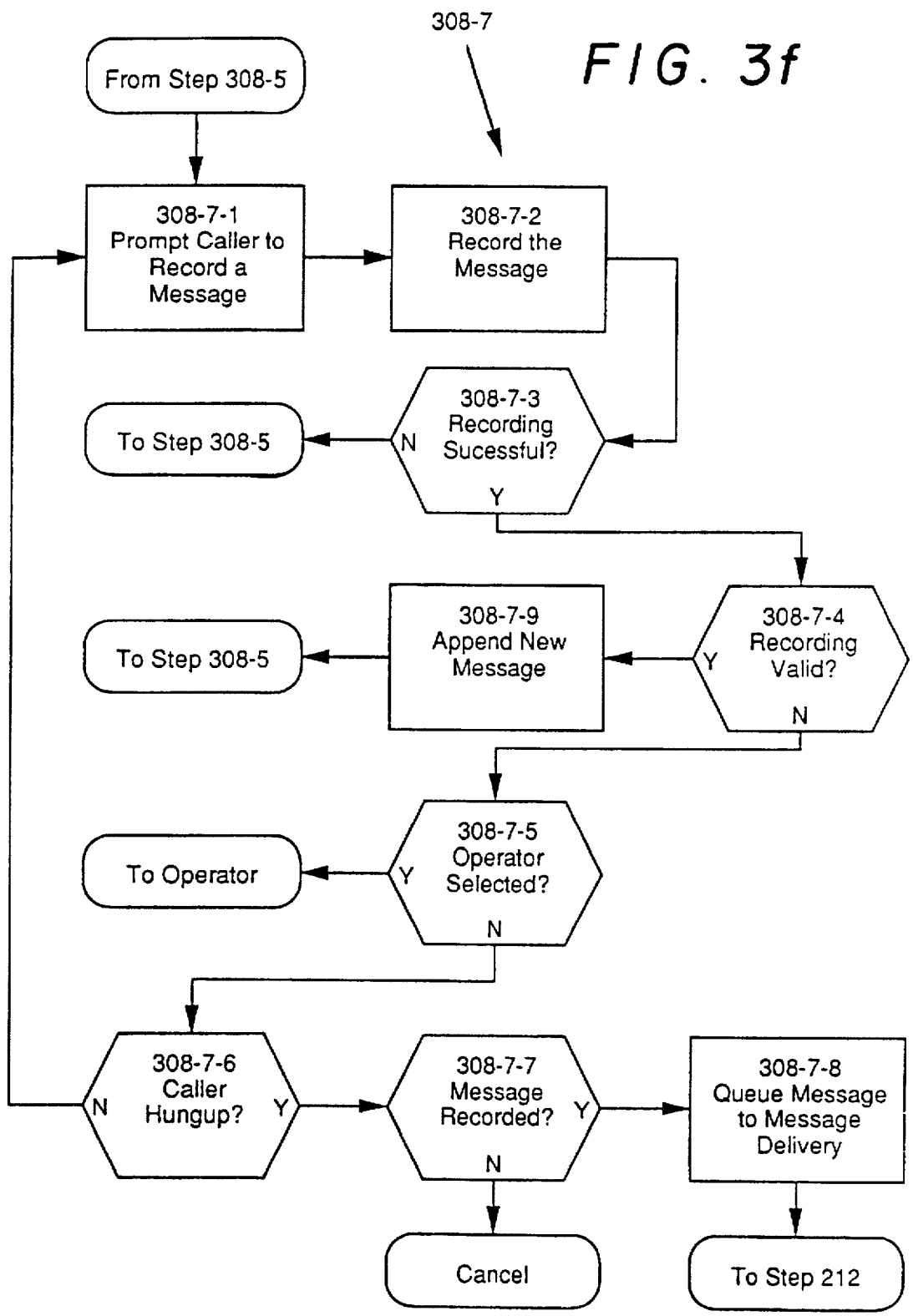
FIG. 3f is a flow diagram of an append message subprocess of step 308-7 of FIG. 3b.

FIG. 3f is a flow diagram of an append message subprocess of step 308-7 of FIG. 3b. Process 308-7 is entered from step 308-5 of FIG. 3b. Process 308-7 begins with step 308-7-1, in which the caller is prompted to record an additional message. In step 308-7-2, the caller records the additional message. In step 308-7-3, it is determined whether recording of the additional message was successful. If not, the process goes to step 308-5, the options menu. If so, the process goes to step 308-7-4 in which it is determined whether recording of the additional message is valid. If the recording is valid, the process goes to step 308-7-9, in which the newly recorded message is appended to the original message. The process then goes to step 308-5, the options menu. If not, the process goes to step 308-7-5, in which it is determined whether the caller selected to be connected to an operator. If so, the caller is connected to an operator. If not, the process goes to step 308-7-6, in which it is determined whether the caller has hung up. If not, the process goes to step 308-7-1 and the append message routine is repeated. If so, the process goes to step 308-7-7, in which it is determined whether the caller recorded a valid original message. If not, the process is canceled. If so, the process goes to step 308-7-8, in which the message is queued to message delivery routine 400. The process then prepares for message delivery routine 400, beginning at step 310 of FIG. 3a.

Further description of the record message menu of the present invention may be found in the exemplary Append Message Menu Pseudocode Program Listing D in the appendix.

Figure 3G:
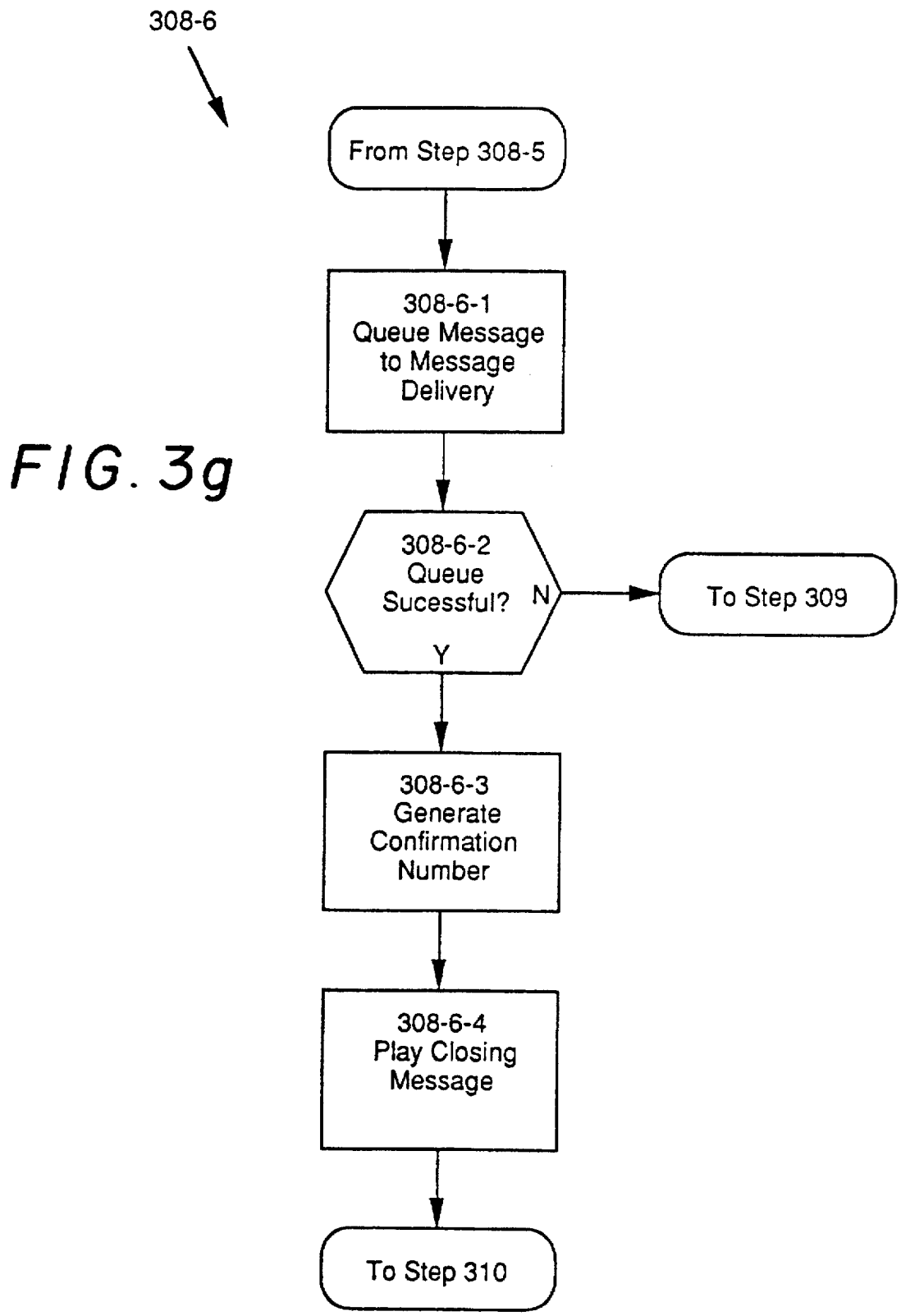
FIG. 3g is a flow diagram of a confirmation number subprocess of step 308-6 of FIG. 3b.

FIG. 3g is a flow diagram of a confirmation number subprocess of step 308-6 of FIG. 3b. Process 308-6 is entered from step 308-5 of FIG. 3b. Process 308-6 begins with step 308-6-1, in which a recorded message is queued to message delivery routine 400. In step 308-6-2, it is determined whether the queue was successful. If not, the process goes to step 309, in which the message is canceled. If so, the process goes to step 308-6-3, in which a confirmation number is generated. In step 308-6-4, a closing informational message, including the confirmation message, is played to the caller. The process then prepares for message delivery routine 400, beginning at step 310 of FIG. 3a.

Further description of the record message menu of the present invention may be found in the exemplary Confirmation Number Routine Pseudocode Program Listing E in the appendix.

FIG. 4 is a flow diagram of message delivery process 400, implemented in system 100 in conjunction with network 102, in accordance with the present invention. Process 400 begins with step 402, in which MCP 144 determines that the time scheduled in step 320 of FIG. 3 for delivery of a message has arrived. In step 404, MCP 144 transmits a command to MP-AS 146 which causes MP-AS 146 to originate a call to the messaging system 100 through bridging switch 106. The command includes a key to the message information record stored on MCP 144 which contains the message file reference number and the caller name file reference number which identify the message to be delivered. The MP-AS originates the call using a special access number which causes the desired routing to occur. The automatic number identification (ANI) message associated with the call contains the key to the message information record stored in MCP 144. In step 406, the audio portion of the call from MP-AS 146 is connected and routed to ARU-AS 134. The data portion of the call including the ANI is extracted by ACD 124 and sent to ACP 142 via ISNAP 136. In step 408, ACP 142 uses the key contained in the ANI message to access the message information record stored in MCP 144. In step 410, ACP 142 transmits a command to ARU-AS 134 which causes ARU-AS to originate a call to the terminating number and connect the call from MP-AS 146 to the newly originated call in a conference call. In step 412, ACP 142 determines whether the call to the terminating number was answered or whether there was ring-no-answer (RNA) or busy. If there was RNA or busy, the process continues with step 414 in which MCP 144 schedules another message delivery attempt call for a later time. The process then loops to step 402. If the terminating number answers the call, the process continues with step 416, in which ACP 142 commands ARU-AS 134 to play a prompt which informs the called party of the message. In step 418, ACP 142 transmits a command to MCP 144 which in turn commands MP-AS 146 to play the caller's recorded name, which identifies the originator of the message to the called party. In step 420, ACP 142 commands ARU-AS 134 to prompt the called party to accept the message. In step 422, ACP 142 determines whether the called party accepts the message. If the called party does not accept the message, the process continues with step 424, in which the call is terminated and step 426, in which unbilled billing information is created. This billing information causes billing system 140 to bill no one for the call. The process then ends. If the called party accepts the message, the process continues with step 428, in which ACP 142 commands MCP 144 which in turn commands MP-AS 146 to play the message to the called party. In step 430, ACP 142 commands ACD 124, via ISNAP 136, to release the call while MP-AS 146 plays the message. In step 432, billed billing information is created. This billing information causes billing system 140 to bill the call to the called party. The process then ends.

Although specific embodiments of the present invention have been disclosed, it will be seen by those of skill in the art that other embodiments which are equivalent are possible.

APPENDIX

Copyright 1994, 1995 MCI Corporation

RECORD MESSAGE MENU - PSEUDOCODE PROGRAM LISTING A

```
if global recollection counter exceeded
    Play "We regret we are unable to complete your call ... "
    Flush caller.
    Return MENU_CALL_COMPLETED.
if this was not a menu re-entry
    Clear menu attempts for this menu.
    Bump pegcount for number of times messenger is offered to callers;
broken
        out by RNA/BUSY/MACHINE answer detection.
    Play "Welcome to Collect Message Service."
    Play "You have asked to record a message to be delivered later."
    Play "MCI will make up to 8 attempts to deliver your collect
message"
else Clear menu re-entry flag.
if menu attempts have been exceeded for this menu
    Play "We did not record a message."
    Play "Please hang up and try your call again."
    Play "Thank you for using 1-800-Collect Message Service."
    Cleanup menu.
    Flush caller.
    Write BDR with term method MT_FLUSH, term status
BDR_STAT_RECORD_FAIL.
    Return MENU_CALL_COMPLETED.
Increment menu attempts for this menu.
Loop MAX_NAME_RECORD_RETRIES times:
    if caller hasn't recorded their name
        Clear File Path.
        Get File Path out of configuration file.
        Clear Name File Name.
```

APPENDIX-continued

Copyright 1994, 1995 MCI Corporation

```
        Generate unique Name File Name.
        Record name with parameters:
            DEFAULT LANGUAGE,
            STOP ON KEY PRESS
            MAX RECORD TIME = 4 seconds
            MAX LEADING SILENCE = 2 seconds
            MAX TRAILING SILENCE = 2 seconds
            BEEP = Yes                            ;beep after
instructions
            PMODE_CLEAR_DTMF,
            Don't append,
            File Path.
            Name File Name.
            Play "Please say your name at the tone."
        if Name was recorded
            Set flag to indicate Name was recorded.
            Break out of loop.
        else Play "We did not record a name."
if caller still hasn't recorded their name
    Play "Please hang up and try your call again."
    Play "Thank you for using Collect Calling Service."
    Write BDR with term method MT_ORIG_DISC, term status
BDR_STAT_RECORD_FAIL.
    Cleanup menu.
    Flush caller.
    Return MENU_CALL_COMPLETED.
if caller hangup
    Write BDR with term method MT_ORIG_DISC, term status
BDR_STAT_MESSENGER
    Cleanup menu.
    Flush caller.
    Return MENU_CALL_COMPLETED.
Play "Please record your message after the tone."
Clear File Path.
Get File Path out of configuration file.
Clear Message File Name.
Generate Message File Name based on unique filename of
Name File Name.
Record message with parameters:
    DEFAULT LANGUAGE
    STOP ON KEY PRESS
    MAX RECORD TIME = 240 seconds
    MAX LEADING SILENCE = 2 seconds
    MAX TRAILING SILENCE = 2 seconds
    BEEP = Yes                            ;beep after instructions
    PMODE_CLEAR_DTMF,
    Don't append,
    File Path.
    Name File Name.
    Play "Press '*' when you are finished."
if Voice recorder failed
    Cleanup menu.
    Prepare to retry this menu.
    Don't count this as a menu attempt.
    Goto start of this menu (return).
if message recording was maximum
    Set flag to indicate message was recorded.
    Play "Your message is four minutes long."
    Tie Time stamp, zone, and Daylight savings indicator to the message.
    Bump pegcount for C18_MESSAGE_ATTEMPT_BY_CALLER.
else if message recording was invalid
    Set flag to indicate message was not recorded.
    Play "We did not record a message."
    Bump pegcount for C18_MESSAGE_ATTEMPT_BY_CALLER.
    Cleanup this menu.
    Prepare to retry this menu.
    Goto start of this menu (return).
else if operator was selected
    Set TTC value
    (TTC_XFERPOINT, TTC_XFER_INIT_PROMPT).
    Bump pegcount C18_XFER_REQUESTED.
    Transfer to manual (SCRP_HOLD_XFER, SCRP_HOLD_XFER)
    Cleanup this menu.
    Return MENU_CALL_COMPLETED.
if caller hungup
    if a message has been recorded
        Queue message to Message Platform.
```

APPENDIX-continued

Copyright 1994, 1995 MCI Corporation

```
        Cleanup this menu.
        Write BDR, term method MT_ORIG_DISC, term status
BDR_STAT_DISCONNECT.
        Return MENU_CALL_COMPLETED.
Write BDR with term method MT_NEW_CALL, term status
BDR_STAT_NORMAL.
if this menu was entered from Erase/Rerecord option
        Cleanup this menu.
        Call Messenger Options Menu (return).
Cleanup this menu.
Prepare to reenter Options menu.
Call Messenger Offer Options Menu (return).
        OFFER OPTIONS MENU - PSEUDOCODE PROGRAM LISTING B if this was not a menu re-entry
        Clear menu attempts for this menu.
else Clear menu re-entry flag.
Increment menu attempts for this menu.
if Options desired per otto.cfg
(PARAM_MESSENGER_OPTIONS_MENU
ACTIVE Y)
        Loop (PARAM_MESSENGER_OFFER_OPTIONS_MENU
MAX_MENU_ATTEMPTS) times:
                if Configuration number desired per otto.cfg
(MESSENGER_CONFIRM_NUMBER_ACTIVE Y)
                        Play "Please hold for your confirmation number."
                if Options menu cannot be retried
                        Break out of loop.
                Play "Press "1" now for more options."
                Play "Or, you may hangup and your message will be delivered."
                if caller entered "1"
                        DTMF is valid.
                        Messenger Options have been selected.
                else if caller did not enter "1"
                        DTMF is valid.
                else if caller selected operator
                        Set TTC value (TTC_XFERPOINT,
TTC_XFER_INIT_PROMPT).
                        Bump pegcount C18_XFER_REQUESTED.
                        Transfer to manual (SCRP_HOLD_XFER,
SCRP_HOLD_XFER)
                        Cleanup this menu.
                        Return MENU_CALL_COMPLETED.
                else
                        Continue looping.
                if DTMF is valid
                        Break out of loop.
        if more attempts for Options Menu remain and DTMF is valid
                if user entered '1' (selected Options)
                        Cleanup this menu.
                        Call Messenger options Menu (return).
                if user hungup
                        if a message was recorded
                                Queue message to Message Platform.
                                Write BDR with term method MT_ORIG_DISC, term
status BDR_STAT_DISCONNECT.
                        Cleanup this menu.
                        Return MENU_CALL_COMPLETED.
Call Message Confirmation Number routine.
if Message Confirmation Number routine failed to queue the message
        Play "Your message has not been accepted."
        Play "Please hangup and try your call again."
        Play "Thank you for using Collect Message Service."
        Write BDR with term method MT_FLUSH, term status BDR
STAT_NORMAL.
Flush the caller.
Cleanup this menu.
Return MENU_CALL_COMPLETED.
        OPTIONS MENU - PSEUDOCODE PROGRAM LISTING C if this was not a menu re-entry
        Clear menu attempts for this menu.
        Set Menu reentry flag to true for next invocation of this menu.
if menu attempts have been exceeded for this menu
        Cleanup menu.
        Call Messenger Confirmation number routine.
                Return MENU_CALL_COMPLETED.
```

APPENDIX-continued

Copyright 1994, 1995 MCI Corporation

```
Increment menu attempts for this menu.
Play "To deliver your message, press '1' now."
Play "To listen to this message, press '2' now."
if current message has at least thirty seconds before maximizing out
        Play "To add to this message, press '3' now."
Play "To erase and rerecord your message, press '4' now."
Play "To cancel this message and exit the system, press '5' now."
if user hungup
        if a message was recorded
                Queue message to Message Platform.
                Write BDR with term method MT_ORIG_DISC, term status
BDR_STAT_DISCONNECT.
        Cleanup this menu.
        Return MENU_CALL_COMPLETED.
if user selected '1' (DELIVER)
        Call Messenger Confirmation Number routine.
        Play "Thank you for using 1-800-Collect Message Service."
        Write BDR with term method MT_FLUSH, term status
BDR_STAT_NORMAL.
        Cleanup menu.
        Return MENU_CALL_COMPLETED.
else if user selected '2' (PLAY)
        Play recorded message to user.
        if user hungup
                if a message was recorded
                        Qu message to Message Platform.
                        Write BDR with term method MT_ORIG_DISC, term status
BDR_STAT_DISCONNECT.
                Cleanup menu.
                Return MENU_CALL_COMPLETED.
        else
                Prepare for reentry to this menu.
                Call Messenger Options Menu (return).
else if user selected '3' (ADD)
        if current message has at least thirty seconds before maximizing out
                Call Messenger Append Message routine.
                if Messenger Append Message routine indicates DONE
                        Cleanup this menu.
                        Return MENU_CALL_COMPLETED.
                else
                        Play "Your message length is the maximum allowed.
                        You may not add to this message."
                Cleanup menu.
                Prepare to reenter this menu.
                Call Messenger Options Menu (return).
        else if user selected '4' (ERASE/RERECORD)
                while (No more available attempts for RecordMessageMenu)
                        Decrement total menu attempts for Record MessageMenu.
                Cleanup menu.
                Set flag indicating erase/rerecord was selected.
                Get audio server name (node).
                Delete recorded message file from local NAS.
                Set flag to indicate message is not recorded.
                Play "Your message has been erased."
                Prepare to retry message creation.
                Call Record Message Menu (return).
else if user selected '5' (CANCEL)
        Ensure at least one more attempt can be made to Record a message:
                Get audio server name (node).
                Delete recorded name file from local NAS.
                Set flag to indicate name is not recorded.
                Delete recorded message file from local NAS.
                Set flag to indicate message is not recorded.
                Play "Your message has been erased."
                Play "Thank you for using Collect Message Service."
                Flush caller.
                Write BDR with term method MT_FLUSH, term status
BDR_STAT_MESSAGE_ERASE.
                Return MENU_CALL_COMPLETED.
else if user selected operator
        Set TTC value
(TTC_XFERPOINT, TTC_XFER_INIT_PROMPT).
        Bump pegcount C18_XFER_REQUESTED.
        Transfer to manual (SCRP_HOLD_XFER, SCRP_HOLD_XFER)
        Cleanup this menu.
        Return MENU_CALL_COMPLETED.
else if invalid selection
```

APPENDIX-continued

Copyright 1994, 1995 MCI Corporation

```
        if attempts for this menu have been exceeded
            Invoke Confirmation number routine.
        else (attempts remain)
            Play "We cannot process your response."
            Prepare for reentering this menu.
            Call Messenger Options Menu (return).
    else (input timeout)
        if attempts for this menu have been exceeded
            Invoke Confirmation number routine.
        else (attempts remain)
            Play "I do not understand your response."
            Prepare for reentering this menu.
            Call Messenger Options Menu (return).
Cleanup menu.
Return MENU_CALL_COMPLETED.
    APPEND MESSAGE MENU - PSEUDOCODE PROGRAM LISTING D Loop for (PARAM_MESSENGER_OPTIONS_MENU
MAX_MENU_ATTEMPTS) times:
    Play "Please begin speaking after the tone."
    Record message:
        DFLT_LANGUAGE,
        ON_KEY_STOP,
        (PARAM_RECORD_MESSAGE_MENU
MAX_RECORD_TIME) - length already recorded,
        PARAM_RECORD_MESSAGE_MENU
MAX_LEADING_SILENCE    20 ;in tenths of a second
        PARAM_RECORD_MESSAGE_MENU
MAX_TRAILING_SILENCE   20 ;in tenths of a second
        PARAM_RECORD_MESSAGE_MENU    BEEP
    Y   ;beep after instructions
        PMODE_CLEAR_DTMF,
        Append,
        File Path.
        Message File Name.
        Play "Press '*' when you are finished."
    if Voice recorder succeeded
        Break out of loop.
    else
        Play "We did not record a message."
if Voice recorder failed (PARAM_MESSENGER_OPTIONS_MENU
MAX_MENU_ATTEMPTS) times
    Cleanup menu.
    Set flag to indicate message was not recorded
    Prepare Options menu for reentry.
    Call Messenger Options Menu.
else
    if recording is valid
        Set flag to indicate message was recorded
        if recording length was maximized
            Play "Your message is four minutes long."
        Write BDR with term method MT_NEW_CALL, term status
BDR_STAT_NORMAL.
        Cleanup menu.
        Prepare Options menu for reentry.
        Call Messenger Options Menu.
    else if user selected operator
        Set flag to indicate message was not recorded
        Set TTC value (TTC_XFERPOINT,
TTC_XFER_INIT_PROMPT).
        Bump pegcount C18_XFER_REQUESTED.
        Transfer to manual (SCRP_HOLD_XFER,
SCRP_HOLD_XFER)
            Cleanup this menu:
            Return DONE.
    else
        Set flag to indicate message was not recorded
        if user hungup
            if a message was recorded
                message to Message Platform
        Write BDR with term method MT_ORIG_DISC, term status
BDR_STAT_DISCONNECT.
        Cleanup this menu.
        Return DONE
Return NOT_DONE.
```

APPENDIX-continued

Copyright 1994, 1995 MCI Corporation

CONFIRMATION NUMBER ROUTINE - PSEUDOCODE PROGRAM LISTING E

```
message to Message Platform.
if message queue failed
    Play "Your message has not been accepted."
    Play "Please hangup and try your call again."
    Play "Thank you for using Collect Message Service."
    Write BDR with term method MT_FLUSH, term status
BDR_STAT_NORMAL.
    Return.
Play "Your message has been recorded."
if Confirmation number configured
(MESSENGER_CONFIRM_NUMBER_ACTIVE = Y)
    if user hungup
        Write BDR with term method MT_ORIG_DISC, term status
BDR_STAT_DISCONNECT.
        Return.
    Play "Your confirmation number is the phone number you dialed plus
three more digits."
    Play "The complete number is . . . "
    Play string (concatenated called number + confirmation number).
    Play "Again, the last three digits of your confirmation number
are . . . "
    Play string (3 digit Confirmation number)
    if Delivery status number configured
(MESSENGER_DELIVERY_STATUS_NUMBER_ACTIVE Y)
        Play "To check on the delivery status of your message call"
        Play "<<18C Collect Status Number>>".
        Play "within 36 hours."
        Play "Again, that number is . . . "
        Play "<<18C Collect Status Number>>"
Play "Thank you for using Collect Message Service."
Write BDR with term method MT_FLUSH, term status
BDR_STAT_NORMAL.
Return.
```

What is claimed is:

1. In a telecommunications network having a public switched telephone network and a messaging platform, a method of delivering voice mail messages from a caller placing a collect call from a calling station to a called party at a called station, comprising the steps of:

A) connecting the collect call from the calling station to the messaging platform via a bridging switch;

B) collecting, via an audio response unit/audio server at the messaging platform, information identifying the called station of the collect call from the caller;

C) originating a completion call from the messaging platform to the called station using the public switched telephone network based on the collected information identifying the called station;

D) detecting at the messaging platform whether the completion call is answered by the called station;

E) obtaining at the messaging platform a voice message from the caller if the completion call is not answered; and F) attempting to deliver the message to the called party from the messaging platform by originating a call from the messaging platform to the called station.

2. The method of claim 1, wherein the step of attempting to deliver the message to the called party from the messaging platform comprises the steps of:

G) originating a message delivery call from the messaging platform to the called station;

H) prompting the called party to accept delivery of the voice message, if the called party answers the message delivery call; and I) delivering the voice message, if the called party accepts delivery of the voice message.

3. The method of claim 2, further comprising the step of:
billing the called party for the message, if the called party accepts the message.

4. The method of claim 1, wherein the step of attempting to deliver the message to the called party from the messaging platform comprises the steps of:
G) scheduling a time at which a message delivery call is to be made;
H) originating a message delivery call to the called station at the scheduled time;
I) detecting whether the message delivery call is answered;
J) repeating steps G, H and I until the message delivery call is answered or the message delivery call goes unanswered a predetermined number of times;
K) prompting the called party to accept delivery of the voice message, if the message delivery call is answered; and
L) delivering the voice message, if the called party accepts delivery of the voice message.

5. The method of claim 4, further comprising the step of:
billing the called party for the voice message, if the called party accepts the voice message.

6. The method of claim 1, further comprising the step of:
assigning the caller a confirmation number for obtaining the delivery status of the voice message from the messaging platform.

7. The method of claim 1, wherein the step of obtaining the voice message comprises the steps of:
G) recording the voice message at the audio server of the audio response unit/audio server of the messaging platform;
H) prompting the caller to select at least one optional function, regarding handling of the voice message; and
I) performing the selected optional function.

8. The method of claim 7, wherein the at least one optional function is selected from a list of optional functions consisting of:
playing back the voice message to the caller, appending an additional voice message to the voice message, erasing and rerecording the voice message, canceling the voice message, and delivering the voice message.

9. The method of claim 7, wherein the step of recording the voice message comprises the steps of:
J) prompting the caller to record the voice message;
K) recording the name of the caller; and
L) recording the voice message of the caller.

10. The method of claim 7, wherein the selected optional function is appending an additional voice message to the voice message and the step of performing the selected optional function comprises the steps of:
J) prompting the caller to record an additional voice message;
K) recording the additional voice message; and
L) appending the additional voice message to the voice message.

11. In a telecommunications network having a public switched telephone network connected to a messaging platform by a bridging switch, a method of delivering voice mail messages from a caller placing a collect call from a calling station to a called party at a called station, comprising the step of:

receiving a collect call at the messaging platform; and wherein the messaging platform on receipt of the collected call determines whether the called station answers the collect call;

completes the collect call normally, if the called station answers;

attempts to obtain a voice message from the caller, if the called station does not answer;

deletes and cancels any message recorded, if the attempt to obtain a voice message from the caller is unsuccessful;

attempts to call the called station to deliver the voice message if a voice message was successfully obtained;

prompts the called party to accept the voice message if the called station answers;

plays the voice message to the called party if the called party accepts the voice message; and charges the called station for the voice message if the called party accepts the voice message.

12. The method of claim 11, wherein the messaging platform comprises a bridging switch and the step of receiving a call at the messaging platform comprises the steps of:
recognizing in the public switched telephone network a collect calling service access number; and
routing the collect call from the public switched telephone network to the bridging switch of the messaging platform based on the access number.

13. The method of claim 11, wherein the messaging platform further comprises an automatic call distributor, a bridging switch, an application processor and a plurality of operator groups including an automated response unit/audio server and a manual telephone operator console, and the step of determining whether the called station answers the collect call comprises the steps of:
routing the collect call from the bridging switch to the automatic call distributor;
selecting, at the application processor, the operator group to which the call is to be routed based on the called number;
routing the collect call from the automatic call distributor to the selected operator group;
collecting, at the selected operator group, information identifying the called station of the collect call from the caller;
putting the collect call on hold at the bridging switch;
originating a completion call from the operator group to the called station; and
detecting whether the called station answers the completion call.

14. The method of claim 11, wherein the step of completing the collect call normally, if the called station answers, comprises the steps of:
prompting, at the audio response unit/audio server, the called party to accept the collect call;
detecting whether the called party accepts the collect call;
releasing the completion call from the bridging switch and extending the collect call to the called station, if the called party accepts the collect call; and
releasing the called station and informing the caller, if the called party does not accept the collect call.

15. The method of claim 11, wherein the messaging platform further comprises a message control processor and a messaging platform audio server having an audio unit/ audio server, and wherein for the step of attempting to obtain a voice message from the caller if the called station does not answer, the audio response unit/audio server performs the steps of:

prompting the caller to accept voice messaging service;

detecting whether the caller accepts voice messaging service;

terminating the call, if the caller does not accept voice messaging service;

recording a voice message from the caller if the caller accepts voice messaging service;

generating an indicator identifying the recorded voice message, when recording of the voice message is completed;

assigning a confirmation number to the recorded voice message;

informing the caller of the confirmation number;

terminating the call from the calling station;

generating billing information indicating that no charge is to be made for the collect call; and transmitting a message indicating that a voice message has been recorded; and wherein the step of attempting to obtain a voice message from the caller if the called station does not answer further comprises the steps of:

retrieving the recorded voice message from the audio response unit/audio server to the messaging platform audio server;

scheduling a delivery time for the recorded voice message in the message control processor; and storing the indicator identifying the recorded voice message in the audio response unit/audio server.

16. The method of claim 11, wherein the step of attempting to call the called station to deliver the voice message, if a voice message was successfully obtained comprises the steps of:

J) determining, at the message control processor, whether the scheduled delivery time for the recorded voice message has arrived;

K) transmitting a command from the message control processor to the messaging platform audio server, the command causing the messaging platform audio server to originate a call to the messaging platform;

L) routing the call originated by the messaging platform audio server to the audio response unit/audio server;

M) originating a delivery call from the audio response unit/audio server to the called number specified in the indicator identifying the recorded voice message stored on the audio response unit/audio server; and N) detecting, at the audio response unit/audio server, whether the called station answers the delivery call.

17. The method of claim 11, wherein the step of prompting the called party to accept the voice message comprises the steps of:

J) informing the called party of that a voice message is available from the audio response unit/audio server;

K) playing the caller's name from the messaging platform audio server;

L) prompting the called party to accept the voice message from the audio response unit/audio server; and M) detecting whether the called party accepts the voice message.

18. A method of delivering collect-voice mail message comprising the steps of:

A) detecting an unanswered collect call from a calling telephone station to a called telephone station at a message platform communicatively connected to the calling telephone station and the called telephone station by a bridging switch;

B) obtaining a voice message from a caller at the calling telephone station and recording the voice message at an audio response unit/audio server of the message platform;

C) originating a notification call to the called telephone station from the message platform;

D) notifying the called party at the called telephone station of the voice message when the called party answers the notification call; and E) playing the recorded voice message to the called party at the called telephone station when the called party accepts the voice message from the message platform;

wherein step B further comprises the steps of:
recording the voice message from the caller;
prompting the caller to select at least one optional function;
receiving the selection from the caller; and
performing the selected optional function.

19. The method of claim 18, wherein:

a plurality of notification calls to the called telephone station are originated until the called telephone station is answered.

20. The method of claim 18, wherein:

a plurality of notification calls to the called telephone station are originated until the called telephone station is answered or the number of calls exceeds a predetermined number.

21. The method 18, further comprising:

charging the called party for delivery of the message, if the message is delivered to the called party.

22. The method of claim 18, further comprising:

generating a confirmation number with which the caller may obtain the delivery status of the voice message and playing it to the caller.

23. The method of claim 18, wherein the optional function is selected from a list of optional functions consisting of playing back the message to the caller, recording an additional message from the caller and appending it to the message, erasing and rerecording the message, canceling the message, and delivering the message to the called party.

24. The method of claim 18, wherein the step of recording the voice message from the caller comprises the steps of:

J) prompting the caller to record the voice message;

K) attempting to record the name of the caller; and

L) attempting to record the voice message of the caller.

25. The method of claim 18, wherein the step of recording an additional message comprises the steps of:

J) prompting the caller to record an additional message; and

K) attempting to record the additional message.

26. A system for delivering voice mail messages from a caller placing a collect call from a calling station to a called party at a called station using a public switched telephone network, comprising:

A) a message platform having an audio response unit/ audio server, coupled to the public switched telephone network, for collecting information identifying the called station of the collect call from the caller;

B) an audio server completion call generator at the message platform for originating a completion call to the called station using the public switched telephone network;

C) an answer detector at the message platform for detecting whether the completion call is answered by the called station;

D) a voice message recorder at the message platform for obtaining a voice message from the caller, if the completion call is not answered; and E) a message delivery system at the message platform for attempting to deliver the message to the called party, the message delivery system including a message call generator for originating a message delivery call to the called station, an audio prompter for prompting the called party to accept delivery of the voice message if the called party answers the message delivery call a message delivery device for delivering the voice message if the called party accepts delivery of the voice message, and a delivery scheduling device for scheduling a time at which a message delivery call is to be made.

27. The system of claim 26, further comprising:

a billing system for billing the called party for the message if the called party accepts the message.

28. The system of claim 26, further comprising:

a confirmation number generator for generating a confirmation number for obtaining the delivery status of the voice message from the messaging platform.

29. The system of claim 26, wherein the voice message recorder comprises:

D-1) an audio recorder for recording the voice message;

D-2) an first audio prompter for prompting the caller to select at least one optional function with regard to the handling of the voice message; and D-3) an optional function performance device for performing the selected optional function.

30. The system of claim 29, wherein the at least one optional function is selected from a list of optional functions consisting of:

playing back the voice message to the caller, appending an additional voice message to the voice message, erasing and rerecording the voice message, canceling the voice message, and delivering the voice message.

31. A collect-call voice mail messaging system for a public switched telephone network located at a message platform communicatively connected to a calling telephone station and a called telephone station by a bridging switch, comprising:

A) a detector coupled to the public switched telephone network for sensing an unanswered collect call from the calling telephone station to the called telephone station;

B) a voice message audio server coupled to the public switched telephone network for prompting for and receiving a voice message from a caller at the calling telephone station;

C) a message call generator coupled to the public switched telephone network for originating a call to the called telephone station subsequent to the voice message audio server having received the voice message from the caller;

D) a voice notification unit coupled to the message call generator for generating a second voice message informing the called party at the called telephone station of the first voice message when the called party answers the call from the message call generator; and E) a voice message unit for playing the first voice message to the called party at the called telephone station when the called party accepts the first voice message.

32. The collect-call voice mail messaging system of claim 31, wherein the message call generator originates a plurality of calls to the called telephone station until the called telephone station is answered.

33. The collect-call voice mail messaging system of claim 31, wherein the message call generator originates a plurality of calls to the called telephone station until the called telephone station is answered or the number of calls exceeds a predetermined number.

34. The collect-call voice mail messaging system of claim 31, further comprising:

a billing system for generating billing information so that the called party is charged for delivery of the message if the message is delivered to the called party.

35. The collect-call voice mail messaging system of claim 31, further comprising:

a confirmation number unit for generating a confirmation number and playing it to the caller, the caller obtaining the delivery status of the voice message from the confirmation number.

36. The collect-call voice mail messaging system of claim 31, wherein the voice message audio server comprises:

B-1) a voice message recorder for recording the voice message from the caller;

B-2) a message generator for prompting the caller to select at least one optional function;

B-3) an optional function selection receiver for receiving the selection from the caller; and B-4) an optional function unit for performing the optional function selected.

37. The collect-call voice mail messaging system of claim 36, wherein the optional function unit comprises:

B-4-1) a playback unit for playing back the message to the caller;

B-4-2) a message appending unit for recording an additional message from the caller and appending it to the message;

B-4-3) a message deletion unit for erasing the message;

B-4-4) a message cancellation unit for canceling the message; and

B-4-5) a message delivery unit for delivering the message to the called party.

38. The collect-call voice mail messaging system of claim 36, wherein the voice message recorder comprises:

B-1-1) a message generator for prompting the caller to record the voice message;

B-1-2) a voice name recorder for attempting to record the name of the caller; and B-1-3) a voice message recorder for attempting to record the voice message of the caller.

39. The collect-call voice mail messaging system of claim 37, wherein the message appending unit comprises a message generator for prompting the caller to record an additional message and a voice message recorder for attempting to record the additional message.

* * * * *